US012447846B2

(12) United States Patent
Lee et al.

(10) Patent No.: US 12,447,846 B2
(45) Date of Patent: Oct. 21, 2025

(54) VEHICLE RECOGNITION FOR AUTOMATIC CHARGE MANAGEMENT

(71) Applicant: PowerFlex Systems, LLC, San Diego, CA (US)

(72) Inventors: Zachary Jordan Lee, Pasadena, CA (US); George Lee, Los Altos, CA (US)

(73) Assignee: PowerFlex Systems, LLC, San Diego, CA (US)

( * ) Notice: Subject to any disclaimer, the term of this patent is extended or adjusted under 35 U.S.C. 154(b) by 827 days.

(21) Appl. No.: 17/651,768

(22) Filed: Feb. 18, 2022

(65) Prior Publication Data

US 2023/0264583 A1     Aug. 24, 2023

(51) Int. Cl.
| | |
|---|---|
| H01M 10/44 | (2006.01) |
| B60L 53/37 | (2019.01) |
| B60L 53/65 | (2019.01) |
| B60L 53/66 | (2019.01) |
| G06Q 30/018 | (2023.01) |
| H01M 10/46 | (2006.01) |

(52) U.S. Cl.
CPC .............. B60L 53/37 (2019.02); B60L 53/65 (2019.02); B60L 53/66 (2019.02); G06Q 30/0185 (2013.01)

(58) Field of Classification Search
CPC ... H02J 7/0042; H02J 7/0044; B60L 2240/62; B60L 53/65; B60L 53/37; B60L 53/66; B60L 53/67; Y02T 90/12
USPC ................................. 320/104, 108, 109, 116
See application file for complete search history.

(56) References Cited

U.S. PATENT DOCUMENTS

| | | | |
|---|---|---|---|
| 10,500,977 B2* | 12/2019 | Anzicek | B60L 50/90 |
| 2011/0199049 A1* | 8/2011 | Nagy | B60L 53/31 |
| | | | 320/109 |
| 2017/0274789 A1* | 9/2017 | Ma | B60L 53/37 |
| 2019/0031038 A1* | 1/2019 | Pursifull | G06Q 50/26 |

(Continued)

FOREIGN PATENT DOCUMENTS

| | | | | |
|---|---|---|---|---|
| DE | 102019121481 A1 * | 2/2020 | | G08G 1/015 |
| EP | 3403868 A1 * | 11/2018 | | |

(Continued)

OTHER PUBLICATIONS

Machine translation EP3403868 (Nov. 21, 2018) (Year: 2018).*

Primary Examiner — Edward Tso
(74) Attorney, Agent, or Firm — Dinsmore & Shohl LLP

(57) ABSTRACT

Certain aspects of the present disclosure provide techniques electric vehicle charging management. In one example, a method includes: detecting a connection between an electric vehicle supply equipment and an electric vehicle; receiving image data depicting an electric vehicle charging scene; determining one or more candidate vehicles in the image data; for each respective candidate vehicle of the one or more candidate vehicles in the image data, determining one or more vehicle characteristics associated with the respective candidate vehicle; associating one candidate vehicle of the one or more candidate vehicles with the electric vehicle based on one or more vehicle characteristics associated with the one candidate vehicle; determining if a user account is associated with the one candidate vehicle associated with the electric vehicle; and determining a charging authorization decision for the electric vehicle.

20 Claims, 14 Drawing Sheets

(56) References Cited

U.S. PATENT DOCUMENTS

| | | | |
|---|---|---|---|
| 2020/0009978 A1* | 1/2020 | Shin | H02J 7/0045 |
| 2021/0061116 A1* | 3/2021 | Lin | B60L 53/37 |
| 2021/0256793 A1* | 8/2021 | Noh | G07F 15/10 |

FOREIGN PATENT DOCUMENTS

| | | | | | |
|---|---|---|---|---|---|
| GB | 2594496 | A | * | 11/2021 | ............ B60L 53/305 |
| JP | 2021113426 | A | * | 8/2021 | |
| KR | 20220072193 | A | * | 6/2022 | |
| KR | 102606368 | B1 | * | 11/2023 | |
| KR | 102617924 | B1 | * | 12/2023 | |
| WO | WO-2016082978 | A1 | * | 6/2016 | ............ B60L 11/182 |

* cited by examiner

VEHICLE RECOGNITION FOR AUTOMATIC CHARGE MANAGEMENT

INTRODUCTION

Aspects of the present disclosure relate to systems and methods for vehicle recognition and automatic charge management.

Electric vehicles (EVs), including plug-in hybrid and fully electric vehicles, are increasing in popularity around the world. It is expected that the proportion of new EVs sold each year out of the total number of vehicles sold will continue to rise for the foreseeable future. Moreover, while EV operators are primarily non-commercial at present (e.g., personal vehicles), commercial vehicle operators are increasingly adding EVs to their fleets for all sorts of commercial operations, thus adding to the number of EVs in operation throughout the world.

The shift from internal combustion engine (ICE)-powered vehicles to EVs requires significant supporting infrastructure anywhere EVs are operated. For example, electric vehicle charging stations, sometimes referred to as electric vehicle supply equipment (EVSE), need to be widely distributed so that operators of EVs are able to traverse the existing roadways without issue.

Charging electric vehicles is different from refueling ICE vehicles in many ways. For example, charging may generally take longer on average than refilling a fuel tank in an ICE vehicle, the cost of electricity for charging may vary more frequently (e.g., hour-by-hour) than that of liquid fuels (e.g., day-by-day), and operators often charge their EVs at home, which is generally not possible for ICE vehicles. Consequently, EV charging infrastructure requires many new considerations and systems to work efficiently.

For example, EV charging providers desire to make the charging process as easy as possible for EV operators because complicated and tedious access to charging resources is a deterrent to EV adoption as well as a competitive disadvantage when multiple EV charging providers are available to EV operators. Similarly, EV charging providers need to manage their charging infrastructure in a way that encourages high utilization to be viable and competitive in the evolving market for such services.

Accordingly, there is a need for improved methods for managing EV charging infrastructure.

SUMMARY

A first aspect provides a method for electric vehicle charging management, comprising: detecting a connection between an electric vehicle supply equipment (EVSE) and an electric vehicle; receiving image data depicting an electric vehicle charging scene; determining one or more candidate vehicles in the image data; for each respective candidate vehicle of the one or more candidate vehicles in the image data, determining one or more vehicle characteristics associated with the respective candidate vehicle; associating one candidate vehicle of the one or more candidate vehicles with the electric vehicle based on one or more vehicle characteristics associated with the one candidate vehicle; determining if a user account is associated with the one candidate vehicle associated with the electric vehicle; and determining a charging authorization decision for the electric vehicle.

A second aspect provides a method of detecting a blocked charging location, comprising: receiving image data depicting an electric vehicle charging scene; determining at least one charging location in the electric vehicle charging scene is occupied by a vehicle that is not associated with an authorized charging session; alerting at least one of a site operator or a user associated with the vehicle that there is no authorized charging session.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure relate to vehicle recognition for automatic charge management. The ability to identify a vehicle and automatically authorize the vehicle for charging based on the positive identification may significantly improve the experience and efficiency of EV charging for both the charge provider (e.g., the EVSE operator) and the charge consumer (e.g., the EV owner). Aspects described herein use image data to automatically recognize vehicles using various techniques (e.g., based on determination of identifying vehicle characteristics) to control charge management and to enable other functions, such as identifying blocked charging locations (e.g., parking stalls), failures to plug in a charger, and the like. Beneficially, such aspects may enable an EV operator to park and initiate a charging session without having to interact with the charging station (e.g., EVSE), with any software systems in the EV, or even with external applications (e.g., on a smart phone). This efficiency may lead to an improved user experience and relatedly higher adoption of EVs as well as more efficient use of EV charging infrastructure since, for example, time at charging stations may not be wasted with authorizing charging through conventional, cumbersome methods.

Example Vehicle Recognition and Charge Management System Data Flow

Figure 1:
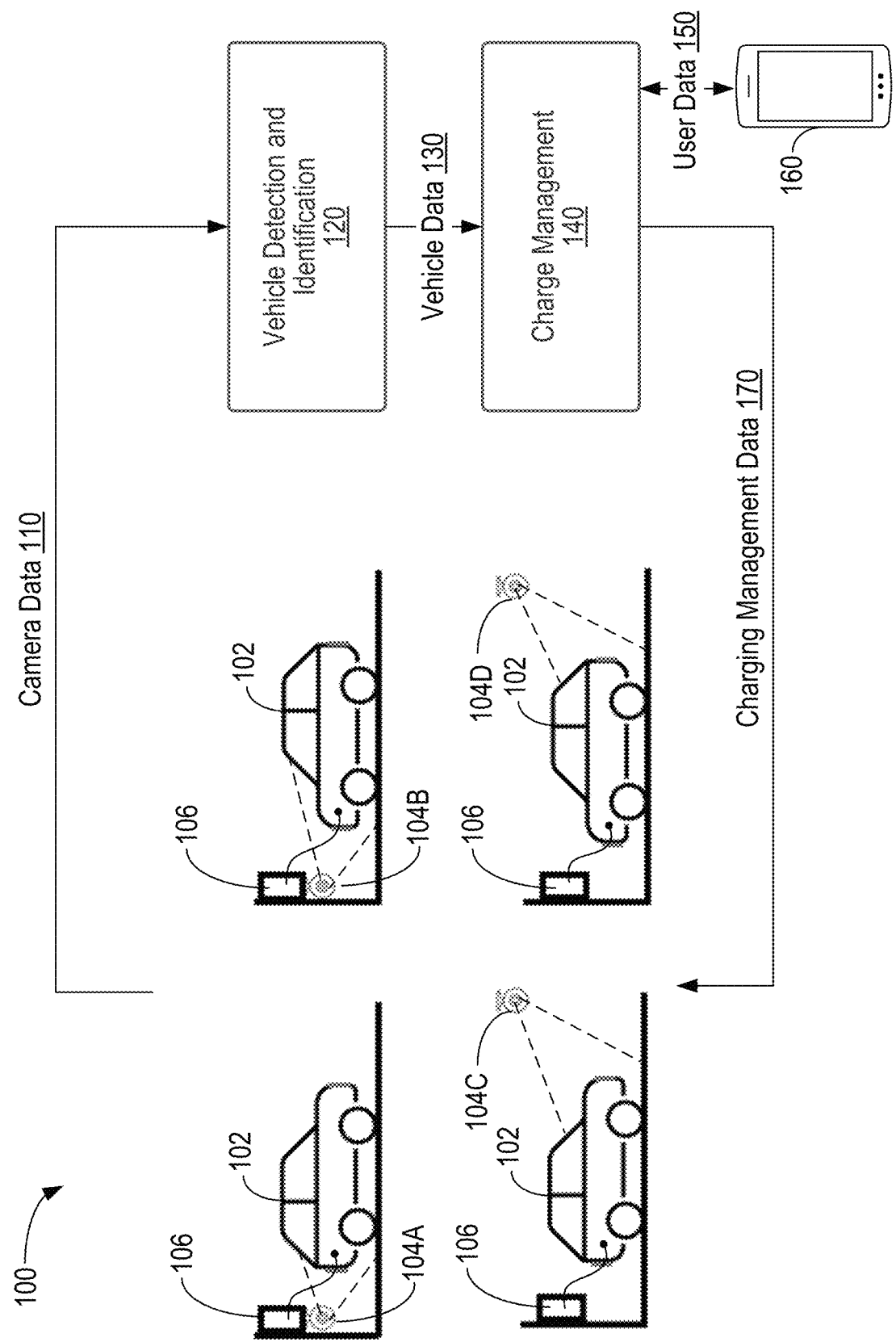
FIG. 1 depicts an example vehicle recognition and charge management system data flow.

FIG. 1 depicts an example vehicle recognition and charge management system data flow 100.

Generally, electric vehicles 102 may park near electric vehicle supply equipment (EVSE) 106 and in view of one or more image sensors, such as cameras 104A-D (collectively, 104). As depicted, cameras 104 may be arranged in various manners in order to have appropriate fields of view for identifying vehicle characteristics. In particular, camera 104A is situated on, near, or integral with EVSE 106 so that it may view the license plate of a vehicle, such as the rear license plate in the case of camera 104A and the front license plate in the case of camera 104B.

Cameras 104C and 104D are alternatively located in positions remote from the EVSE, but nevertheless configured to view vehicle characteristics, including license plates, graphic identifications (e.g., barcodes and quick response (QR) codes), and other vehicle characteristics.

While license plates are one convenient example of vehicle identification information in which there is generally a one-to-one correspondence between an individual plate number and an individual vehicle, the image data generated by cameras 104 may be used to identify a wide range of vehicle identification data. By way of example, the image data may be used to determine license plate characters, license plate state of origin, vehicle make, vehicle model, vehicle style (e.g., truck, sedan, convertible, van, etc.), vehicle color, vehicle identification graphics (e.g., bar codes, QR codes, and other types of identification graphics), and others. Further, cameras 104 may identify other information about a vehicle that may be used for identification and other purposes, such as vehicle location, vehicle arrival time, vehicle departure time, whether or not the vehicle is plugged in, etc. As described in more detail with respect to FIG. 3, these and other characteristics may be derived from image data generated by cameras 104 using various types of models, including machine learning models such as neural network models, tree-based models, support vector machine (SVM) models, image segmentation models, computer-vision models, and other types of models.

As depicted in FIG. 1, cameras 104 may generally generate camera data 110, which may include image data as well as other data generated on the camera, such as time stamps, image statistics, etc. In some cases, cameras 104 may have on-board models and/or functionalities for detecting certain vehicle characteristics, including those discussed above. Cameras 104 may also have additional sensors or sensing capabilities "on-board", such as motion sensors and the like for determining presence of a vehicle without image data. In some cases, cameras 104 may be equipped with on-board processing equipment for processing models based on image data and other sensor data for making various vehicle detection and identification determinations.

Camera data 110 is provided to vehicle detection and identification element 120, which in various aspects may be implemented locally on cameras 104, on collocated computing equipment (not depicted), such as dedicated servers or other processing equipment collocated with the parking facility and EVSEs 106, on remote processing hardware or services, such as on a cloud-based processing service, or using combinations of the above.

Figure 3:
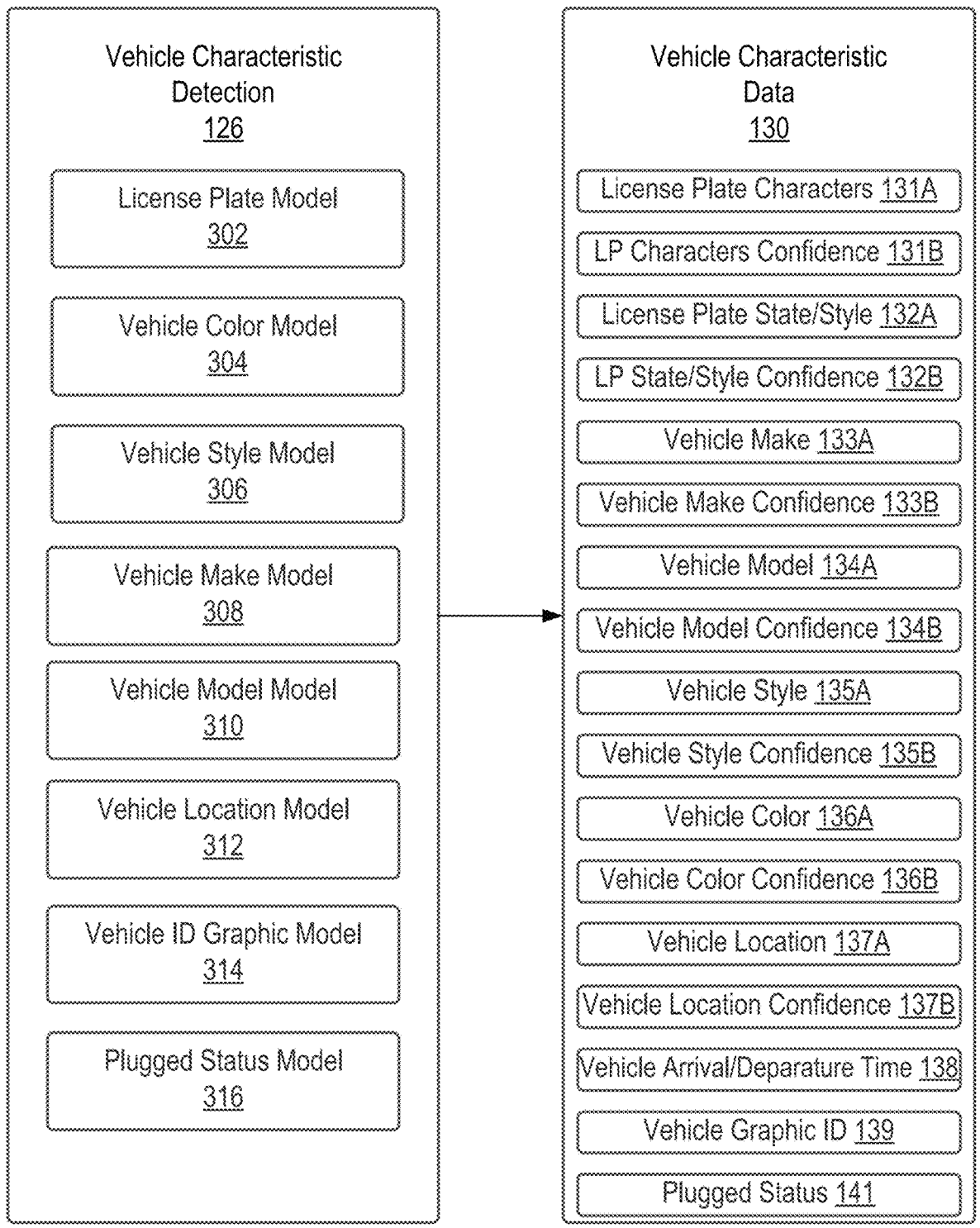
FIG. 3 depicts various aspects of a vehicle characteristic detection element.

Vehicle detection and identification element 120 processes camera data 110 and generates vehicle characteristic data 130, which is described in more detail with respect to FIG. 3. Vehicle characteristic data 130 may include vehicle identifying characteristics, such as those described above.

Vehicle characteristic data 130 is then used by charge management element 140 to, for example, authorize (or deny or terminate) a charging session for vehicle 102 using EVSE 106.

Charge management element 140 may send and receive user data 150 to and from a user, e.g., via a mobile application on a user device 160 (e.g., a mobile device). User device 160 may include, for example, a smartphone, a smart wearable device, a tablet computer, a computer system within vehicle 102, and other data processing systems. User data 150 may include, for example, a charge authorization or confirmation, a denied authorization, vehicle information, charge preferences, notifications, calendar data, and the like. In some cases, user data may include a query from charge management element 140 about whether to initiate a charging session. As further described herein, user data may include notifications from charge management element 140 to a user, such as a notification that an EV that is in a charging stall, but not plugged in, or is done charging, and the like.

Charge management element 140 may generate and provide charge management data 170 to EVSEs 106, including, for example, authorizing or denying a charging session, setting charging parameters (e.g., time, power level, power need, scheduled departure or loiter time, etc.). Charge management data is described in more detail with respect to FIG. 2.

Example Vehicle Recognition and Charge Management System

Figure 2:
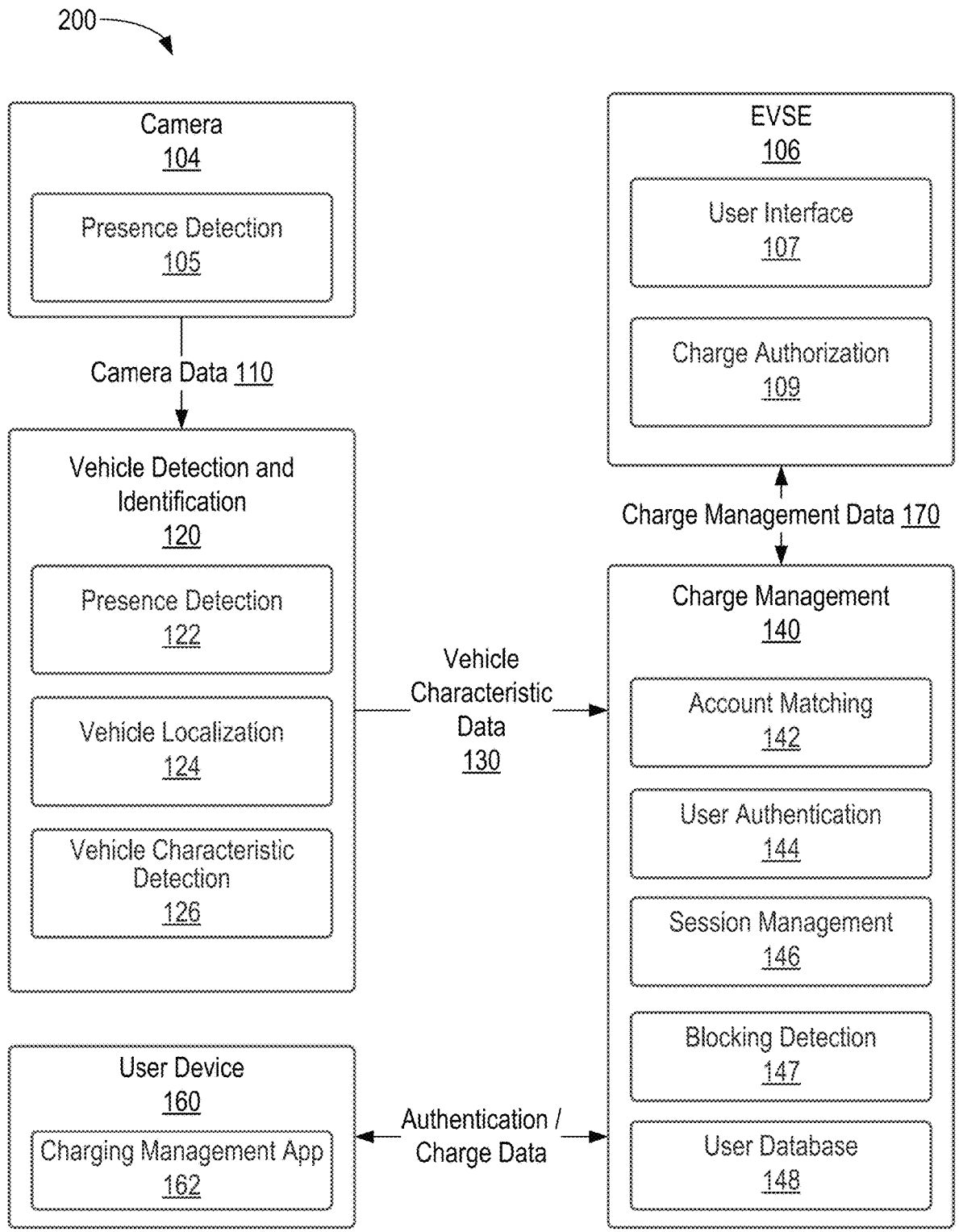
FIG. 2 depicts aspects of a vehicle recognition and charge management system.

FIG. 2 depicts aspects of a vehicle recognition and charge management system 200.

System 200 generally includes one or more cameras 104. A camera 104 may generally include one or more image sensors, such as visual light sensors, infrared or other spectral sensors, and the like. Further, camera 104 may include multiple image subsystems, such as a wide angle image sensor, a telephoto image sensor, etc.

In the depicted example, camera 104 also includes a presence detection element 105, which may be implemented using hardware, software, and/or a combination of hardware and software. For example, presence detection element 105 may include a motion sensor, or a presence detection model based on image data generated by camera 104.

Though not depicted, camera 104 may also include lighting elements, range-finding elements, and the like.

Camera 104 generates camera data 110, which as described above may include image data (e.g., raw or processed image data) as well as other types of camera-generated data, such as presence detection data and the like.

As described generally with respect to FIG. 1, camera data 110 is provided to vehicle detection and identification element 120. Though depicted separately in FIG. 2 for conceptual clarity, in some implementations, one or more aspects of vehicle detection and identification element 120 may be implemented "on" camera 104, such as by processing systems integral with camera 104.

Vehicle detection and identification element 120 includes presence detection element 122, which is generally configured to determine the presence of a vehicle (e.g., vehicle 102 in FIG. 1) in, for example, charging location (e.g., a parking spot or stall). Presence detection element 122 may be implemented in some cases using one or more models, such as a machine learning model, that takes as an input one or more features of camera data 110 and predicts whether or not a vehicle is present. Further, presence detection element 122 may receive data from presence-specific sensors, such as pressure pads or proximity sensors, magnetic or capacitive ground loops, or the like, which are configured to indicate a vehicle's presence in a known location.

Vehicle detection and identification element 120 further includes vehicle localization element 124, which is generally configured to localize a vehicle within, for example, a particular charging location (e.g., parking spot or stall), or in a position identified with respect to the known location of an EVSE, or the like. For example, once a vehicle is detected by presence detection element 122, which as above may be implemented by multiple means including sensors and/or models, then system 200 may determine a more specific localization of the vehicle in a parking spot or stall associated with and/or adjacent to an EVSE. This may be particularly useful when presence detection is not based on camera data 110, or when presence detection is determined by a coarse detection model (e.g., a lightweight model running on camera 104) that is not configured to determine fine-grained localization.

Vehicle detection and identification element 120 further includes vehicle characteristic detection element 126, which is generally configured to determine various characteristics about a vehicle, such as those described in more detail with respect to FIG. 3.

In some implementations, presence detection element 122, vehicle localization element 124, and vehicle characteristic detection element 126 may be triggered in a serial or otherwise logically-ordered fashion in order to efficiently use compute resources and power. For example, a detection by presence detection element 122, may then cause vehicle localization element 124 to perform a localization, and a successful localization my then cause vehicle characteristic detection element 126 to perform a more complex vehicle characteristic detection process. In this way, computing resources may be used efficiently, and various processes may be distributed to lower power processing nodes, such as on camera 104 in various implementations.

Vehicle detection and identification element 120 generates vehicle characteristic data 130, which may be used by charge management element 140 to control charging through EVSE 106. In the depicted example, charge management element 140 includes an account matching element 142, which is generally configured to match a user account associated with a vehicle (e.g., stored in registered user database 148) based on the vehicle characteristic data 130 provided by vehicle detection and identification element 120.

For example, if vehicle characteristic data 130 includes detected license plate characters, those may be matched with a user account having a vehicle profile that includes a license plate with the same characters. Notably, this is just one example, and as described further below, any one or combination of vehicle characteristics may be used to identify a user account with a matching vehicle. FIGS. 5-8 describe in further detail aspects of account matching that may be implemented by account matching element 142.

Charge management element 140 further includes user authentication element 144, which may generally be configured to authenticate a user, such as when a user requests or approves a charging session managed by session management element 146. In various aspects, user authentication element 144 may receive authentication data, including user credentials (e.g., usernames and passwords, pin codes, etc.), user biometric data, user identifying device data (e.g., RFID tags), and the like. In one example, user authentication data may be provided by user device 160, e.g., through a charge management application 162. Charge management application may be provided to user device 160 through, for example, an application store (e.g., "app store") and by an organization that operates charging equipment, such as EVSE 106.

Charge management element 140 further includes session management element 146, which may generally be configured to control charging of a user's vehicle through, for example, EVSE 106. Session management element 146 may generate charge management data 170 for EVSE 106, which may include charging control data (e.g., authorization, rate, voltage, amperage, total capacity, target charge capacity, estimated time for charging, charge priority, acceptable power costs based on user preference, etc.).

Session management element 146 may also manage authorization of a charge session by a user through interaction with, for example, charging management application 162 on user device 160. For example, session management element 146 may send a push notification or other sort of query to user device 160 and receive a confirmation back from user device 160 before authorizing a charging session at EVSE 160. Alternatively, a user may "claim" a charging session through charging management application 162. For example, charge management element 140 may indicate through charge management application 162 a charging session that is estimated to be associated with the user of charge management application 162, and that user may claim the session through charge management application 162. Other mechanisms for obtaining authorization (or confirmation) from the user include, mobile app push notifications, text messages, emails, and automated phone calls, to name a few.

Session management element 146 may also track the availability of charging locations and/or EVSEs. For example, when a vehicle is detected in a particular charging location, that location may be updated (e.g., in a database) as occupied until the vehicle is no longer detected. Similarly, when an EVSE is determined to be in use (e.g., via charge management data 170), then it may be updated as in-use or unavailable (e.g., in a database) until its use is no longer detected.

Charge management element 140 further includes blocking detection element 147, which may generally be configured to determine whether a vehicle is blocking a charging location. For example, if a user's vehicle concludes charging but is still detected or otherwise assumed to be in the charging location, blocking detection element 147 may detect a "blocked" state of the charging location and notify the user, e.g., through a message to user device 160 and/or charging management application 162. An example method for blocking detection is described further below with respect to FIG. 9.

Charge management element 140 further includes user database 148, which may generally be configured to store various information about a user, including information about its vehicle(s), such as its battery capacity, maximum charging rate, schedule for charging, as well as financial information, such as the user's payment information. User database 148 may also store information about past user charging sessions and other related user activity.

User device 160 generally, and in this example charge management application 162 specifically, may further provide charge preference data as well as vehicle data to charge management element 140, which may be used by session management element 146 in some cases. For example, a user may provide information about its vehicle(s), such as its battery capacity, maximum charging rate, schedule for charging, as well as financial information, such as the user's payment information to charge management element 140, and specifically user database 148 in some examples, via charging management application 162.

In the depicted example, EVSE 106 includes a user interface 107, such as a screen or touchscreen, one or more buttons, a speaker, a card reader, a radio-frequency identification (RFID) or other near-field communication (NFC) reader, in order that a user may authorize a charge or set charging preferences manually if necessary. For example, if a user was in a rented or borrowed vehicle not associated with the user in user database 148, the user may need to manually authorize a charging session through user interface 107 of EVSE 106.

Further, in some embodiments, EVSE 106 may include an identifier, such as a physical identifier (e.g., a unique number, barcode, QR code, name, or the like) or a digital identifier, such as a screen capable of displaying a unique number, barcode, QR code, name, or the like. Such an EVSE identifier may be used by a user to authorize a charging session manually (e.g., through application 162). For example, a user may connect a vehicle to EVSE 106, determine EVSE 106's unique identifier (e.g., through visual inspection, camera application for barcode and/or QR scanning, or the like), and enter EVSE 106's unique identifier into an appropriate portion of charging management application 162 so that a charging session is authorized and associated with the user. In yet another example, EVSE 106 may present a uniform resource locator (URL) to a user (either physically or digitally) and by following the link, it may launch a manual charging authorization portal (e.g., over the internet) and/or may launch charging management application 162 automatically. The URL may be encoded with EVSE 106's unique identifier so that the manual authorization process is otherwise streamlined.

EVSE 106 further includes a charge authorization element 109 configured to authorize (or deny) charging sessions at EVSE 106. For example, charge authorization element 109 may determine authorization based on charge management data 170 provided by charge management element 140.

While depicted separately in this example, one or more aspects of charge management element 140 may be implemented within EVSE 106. Further, one or more aspects of vehicle detection and identification element 120 and camera 104 may be implemented within EVSE 106. For example, EVSE 106 may have an integral camera and integral detection and identification processing systems, and may implement charge management element 140 locally.

Generally, as described above, various elements of system 200 may be implemented within camera 104, EVSE 106, on local processing hardware, such as an on-site server emplacement, or remotely, such as at remote processing facility or in a cloud computing service. Thus, the various elements described with respect to FIG. 2 may be considered modular and capable of implementation in a variety of system architectures.

Further, while various elements relevant to system 200 are depicted, note that other elements of devices such as camera 104 and EVSE 106 are omitted for clarity. For example, EVSE 106 may include various elements for charge control, monitoring, communication, etc.

FIG. 3 depicts and describes in more detail various aspects of vehicle characteristic detection element 126, which was introduced generally with respect to FIG. 2.

In this example, vehicle characteristic detection element 126 includes a plurality of models that are generally configured to identify, estimate, predict or otherwise determine various characteristics of a vehicle. In particular, vehicle characteristic detection element 126 includes license plate model 302, which may generally be configured to predict license plate characters 131A and/or license plate state (or style) 132A based on camera data (e.g., camera data 110 of FIGS. 1 and 2). In some cases, license plate model 302 may further generate confidence values (e.g., a percentage confidence level) for any predicted license plate attribute, such as license plate characters confidence 131B and/or license plate state (or style) confidence 132B. The confidence values may be beneficial when performing fuzzy matching procedures or when weighing various model predictions in order to determine whether a positive vehicle identification has been made or not. For example, a low confidence license plate characters prediction may be offset by very high confidence predictions of vehicle make 133A and vehicle model 133A when a matching make and model is associated with a user account (e.g., in user database 148 of FIG. 2).

Vehicle characteristic detection element 126 further includes vehicle color model 304, which may generally be configured to predict vehicle color 136A based on camera data (e.g., camera data 110 of FIGS. 1 and 2). As in the previous example, vehicle color model 304 may also generate vehicle color confidence 136B values for any predicted color. Predicted colors may include colors such as red, green, black, blue, white, etc., or vehicle shades, such as light or dark. Vehicle shades may be useful when ambient lighting reduces color fidelity in camera data, or when monochromatic imaging sensors (e.g., infrared sensors) are used.

Vehicle characteristic detection element 126 further includes vehicle style model 306, which may generally be configured to predict vehicle style 135A based on camera data (e.g., camera data 110 of FIGS. 1 and 2). Further, vehicle style model 306 may also generate vehicle style confidence 135B values for any predicted style. Styles may include, for example: car, truck, sedan, coupe, van, pick-up truck, sports utility vehicle (SUV), convertible, van, bus, four-door vehicle, two-door vehicle, large vehicle, small vehicle, and others. In some cases, vehicle style model 306 may predict multiple styles, such as a large SUV, or convertible coupe.

Vehicle characteristic detection element 126 further includes vehicle make model 308, which may generally be configured to predict vehicle make 133A based on camera data (e.g., camera data 110 of FIGS. 1 and 2). Further, vehicle make model 308 may also generate vehicle make confidence 133B values for any predicted make. A vehicle make may be associated with a company that produces the vehicle, such as FORD®, MCLAREN®, or the like.

Vehicle characteristic detection element 126 further includes vehicle model model 310, which may generally be configured to predict vehicle model 134A based on camera data (e.g., camera data 110 of FIGS. 1 and 2). Further, vehicle model model 310 may also generate vehicle model confidence 134B values for any predicted model. A vehicle model may be a particular model sold by a given make.

Vehicle characteristic detection element 126 further includes vehicle location model 312, which may generally be configured to predict vehicle location 137A based on camera data (e.g., camera data 110 of FIGS. 1 and 2). Further, vehicle location model 312 may also generate vehicle location confidence 137B values for any predicted location. In some cases, a location may be an absolute location, such as a grid or GPS position, or a relative position, such an adjacency to a known location (e.g., an EVSE) location. A location may also be a relative location, such as numbered parking spot or stall, a parking garage floor, and the like.

Vehicle characteristic detection element 126 further includes vehicle identification graphic model 314, which may generally be configured to identify vehicle identification graphic(s) 139 based on camera data (e.g., camera data 110 of FIGS. 1 and 2). For example, a vehicle identification graphic may be a barcode or QR code or other visual graphic that conveys identification information. Where visual indicators, such as QR codes, are used for vehicle identification, the cameras operating as part of the vehicle recognition and charge management system (e.g., system 200) may be positioned to ensure appropriate fields of view (e.g., positioned high if the visual indicator is on top of the vehicle).

Vehicle characteristic detection element 126 further includes plugged status model 316, which may generally be configured to determine whether a charging cable has been plugged into the vehicle (e.g., plugged status 141) based on images of the vehicle. For example, a model may be trained based on images of vehicles with and without charging cables plugged in so that a model may predict in new image data whether a charging cable is plugged into the vehicle.

Vehicle characteristic data 130 may also include a vehicle arrival and/or departure time, such as may be determined based on presence detection element 122 described with respect to FIG. 2.

While several examples of vehicle characteristic detection models and vehicle characteristic data have been discussed with respect to FIG. 3, other examples are possible. Notably, while shown as individual models in this example for conceptual clarity, any number of the depicted models may be combined into a combined model architecture. Further, while various models are depicted, not all models need be implemented in every aspect. For example, any one or more of the models depicted in FIG. 2 may be implemented to perform vehicle characteristic detection. Similarly, while various vehicle characteristics are depicted, not all characteristics need be implemented in every aspect.

Figure 4A:
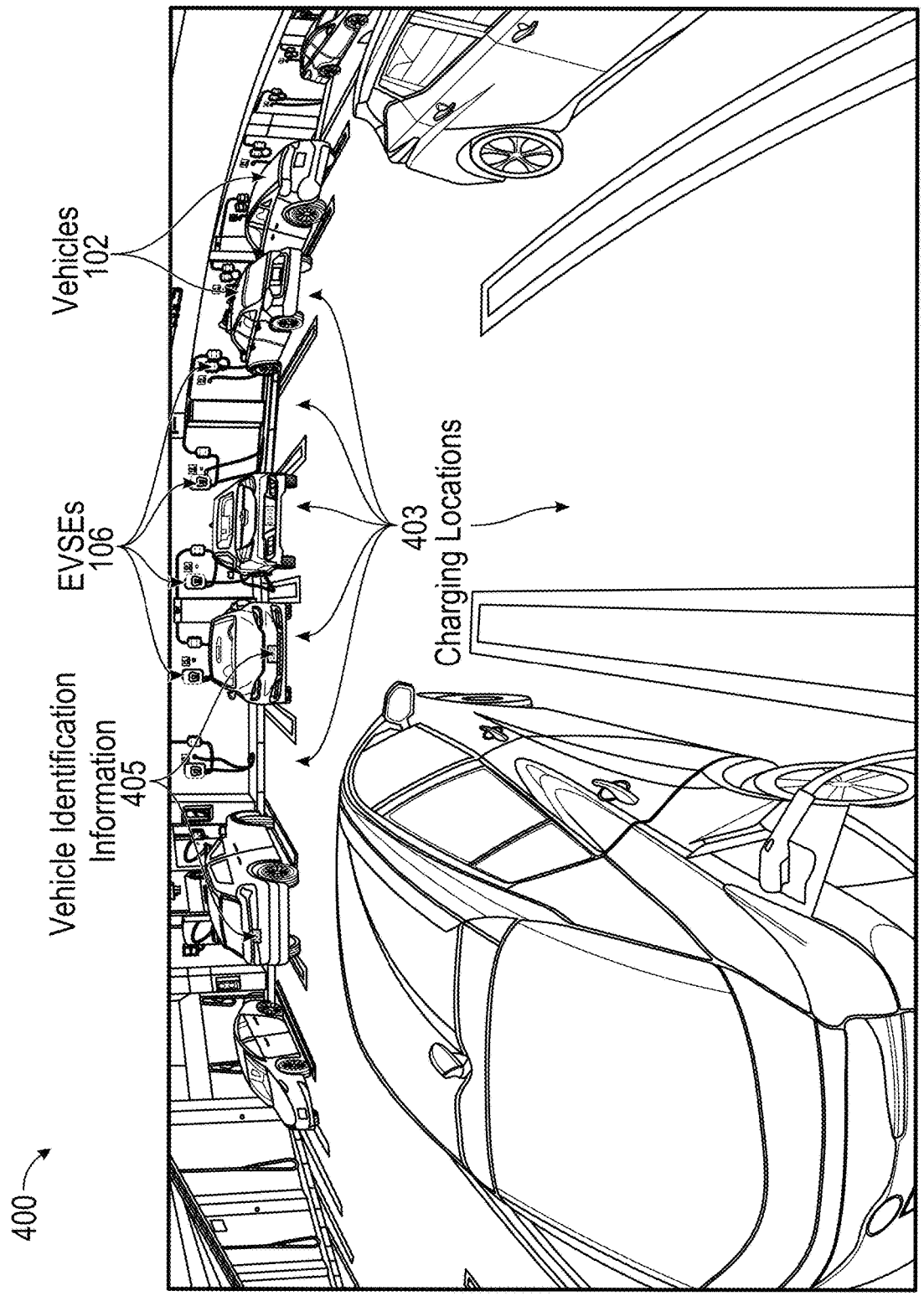
FIGS. 4A-4C depict example image data that may be generated by a camera in a vehicle recognition and charge management system.
Figure 4B:
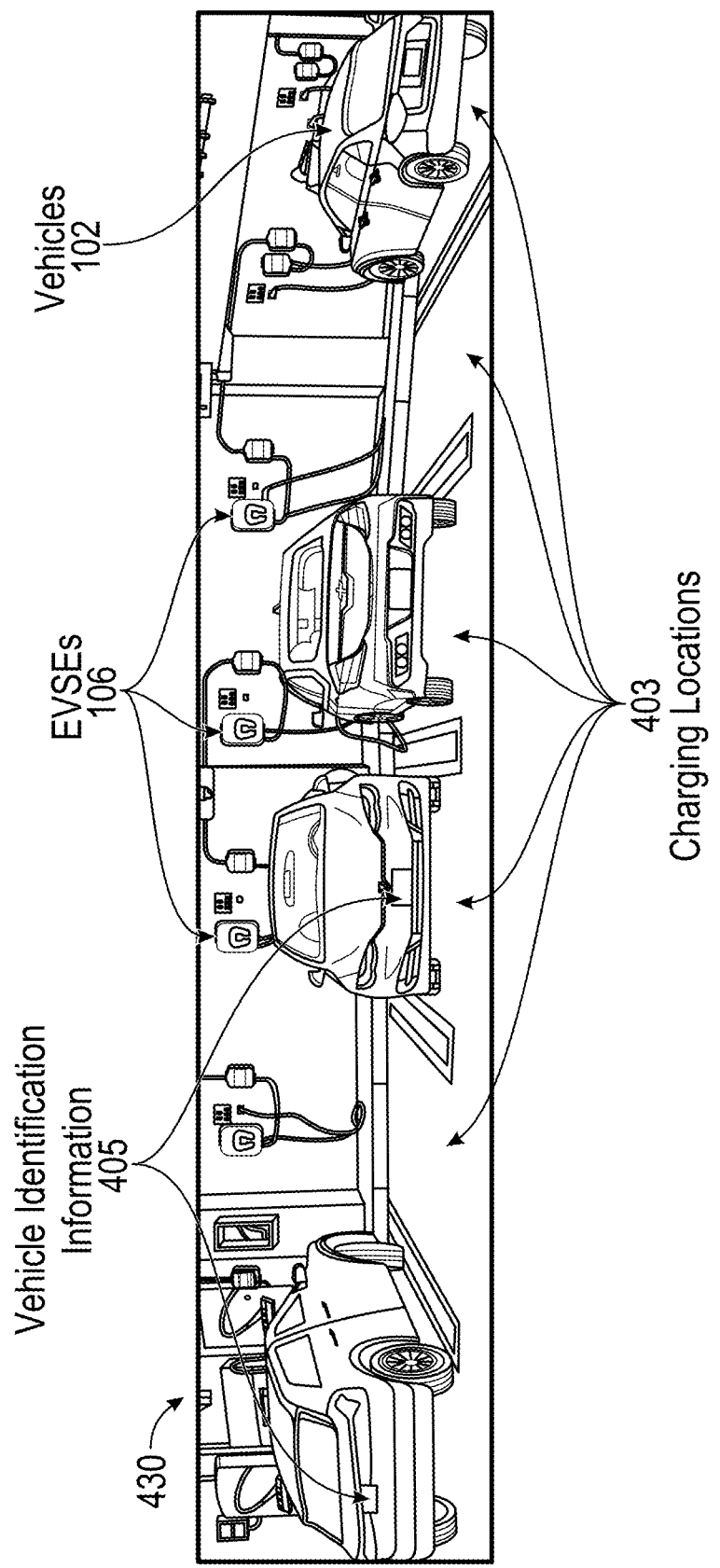
Figure 4C:
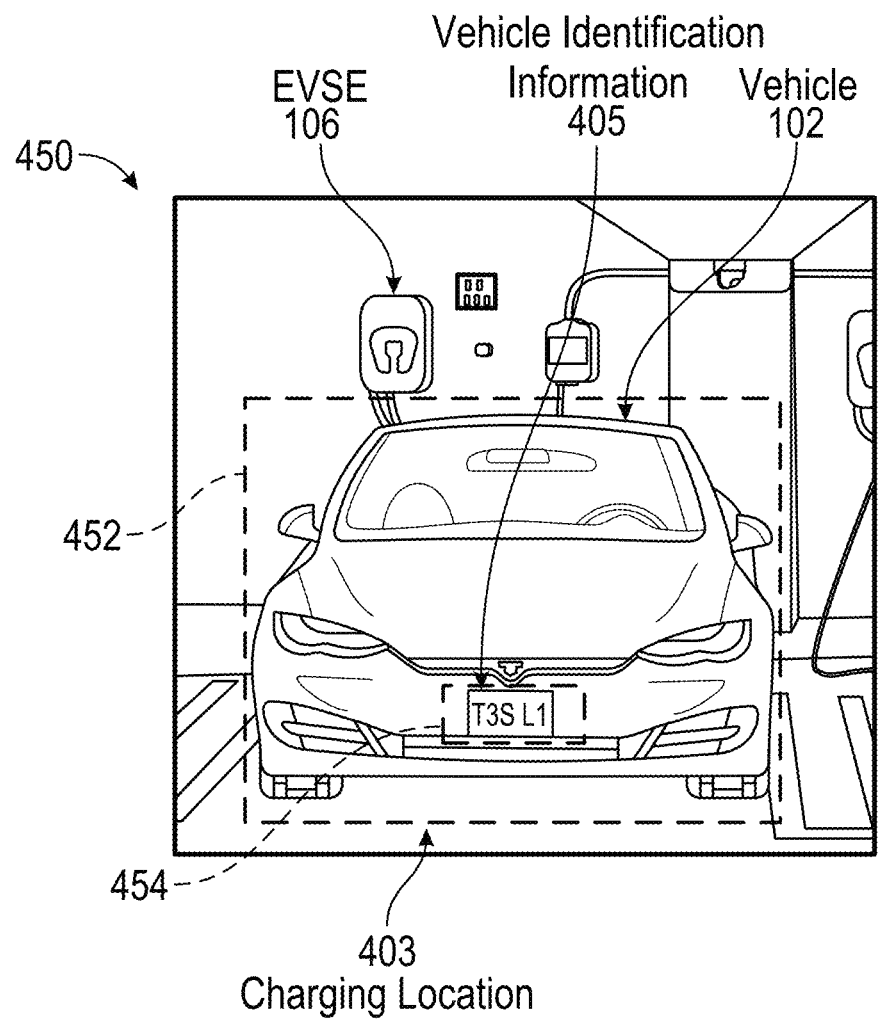

Example Camera Configurations for Vehicle Recognition and Charge Management Systems FIGS. 4A-4C depict example image data that may be generated by a camera in a vehicle recognition and charge management system, such as camera 104 depicted and described with respect to FIGS. 1 and 2. The example image is an example of camera data 110 depicted and described with respect to FIGS. 1 and 2.

Figure 5:
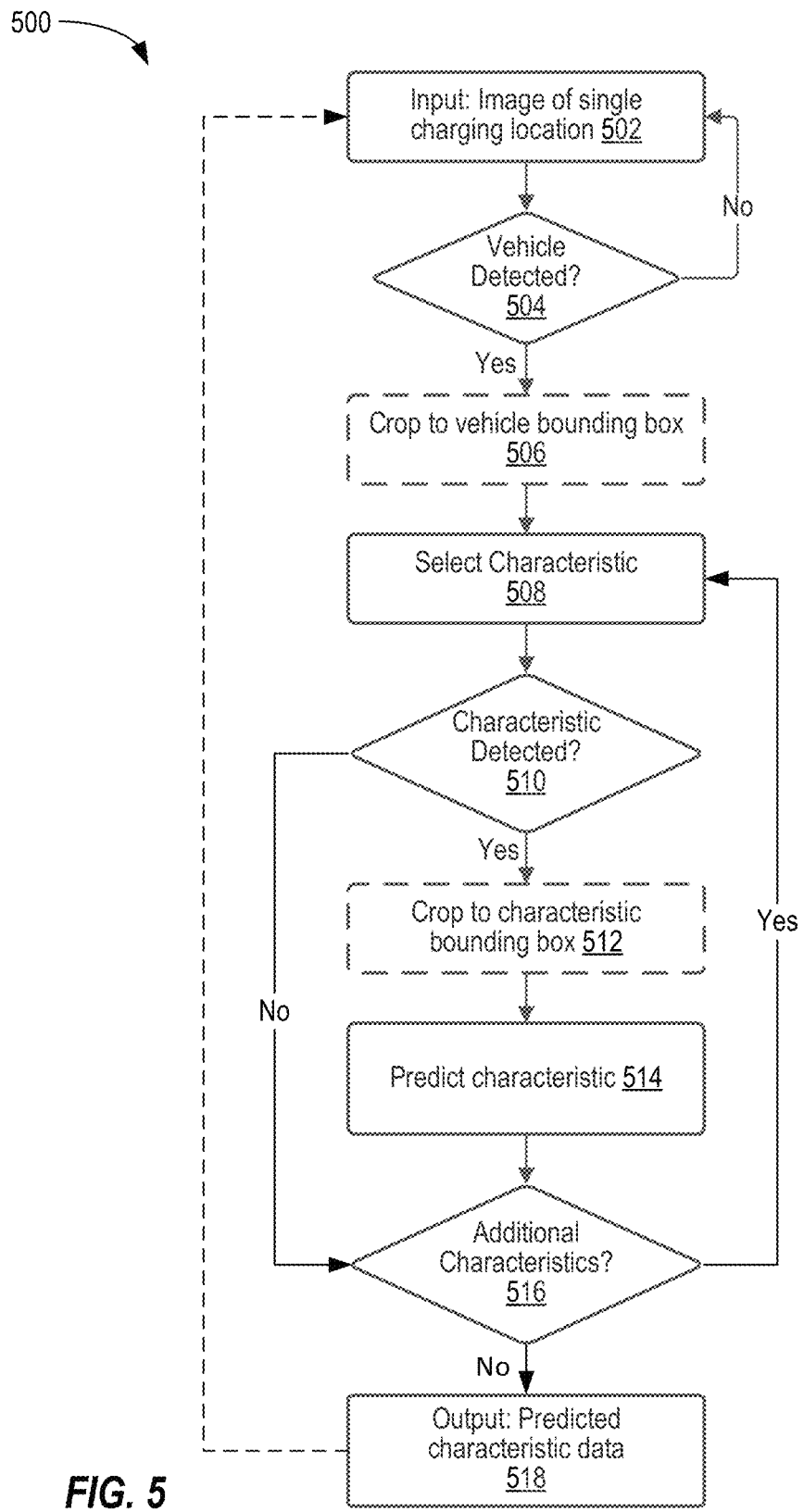
FIG. 5 depicts an example process flow for performing vehicle presence and characteristic detection.
Figure 6:
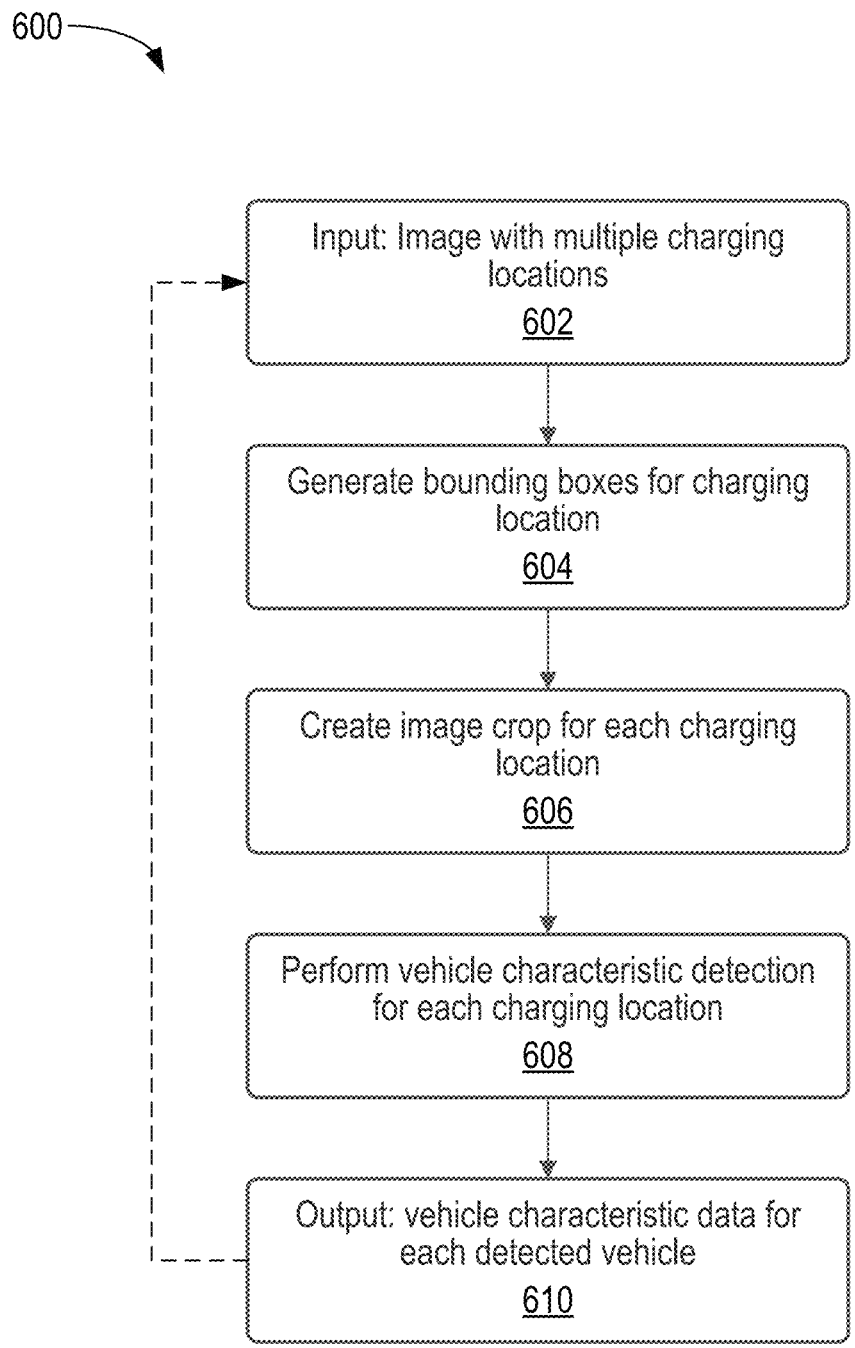
FIG. 6 depicts another example process flow for performing vehicle presences and characteristic detection.

In general, cameras may be set up in various manners for use by a vehicle recognition and charge management system, such as system 200 described with respect to FIG. 2. In the examples of FIGS. 4A and 4B, one camera may view multiple charging locations (e.g., multiple parking stalls associated with multiple EVSEs) and multiple vehicles. FIG. 6 describes a process flow for vehicle recognition based on a single camera/multiple vehicle field of view configuration. Alternatively, one camera may view a single charging location (e.g., associated with one parking stall and one EVSE). FIG. 5 describes a process flow for vehicle recognition based on a single camera/single vehicle field of view configuration. And in yet another alternative, a single camera may have a field of view covering multiple charging locations, but may be cropped or masked to focus on only one charging location.

FIG. 4A depicts raw image data feed from a camera that has a field of view 400 that covers multiple charging locations 403, multiple EVSEs 106, multiple vehicles 102, with various vehicle identification information, such as license plates 405. As in the image, charging locations in this example may include specific parking stalls, and each parking stall may be associated with one or more EVSEs 106.

FIG. 4B depicts cropped image data from the camera that has a cropped field of view 430 that covers multiple charging locations 403, multiple EVSEs 106, multiple vehicles 102, but only one row of charging locations. This sort of crop may simplify vehicle localization because the charging locations only span the horizontal dimension and not the vertical dimension of the image data.

In some deployments, an EVSE may be aligned and/or associated with specific charging locations. However, in other deployments, a single EVSE may be shared among multiple charging locations. For example, a single EVSE may be set between charging locations in order to serve two or more locations. In some cases, the single EVSE may have only one charging cable to be shared by multiple charging locations, or may have multiple charging cables to be shared by multiple charging locations. Accordingly, there may be significant complexity in associating a charging session with a vehicle based on raw image data.

FIG. 4C depicts a further cropped image from the camera that has a field of view 450 that covers a single charging locations 403, a single EVSE 106, and a single vehicle 102. Alternatively, FIG. 4C might be generated by a camera with an original field of view 450 (i.e., not a cropped field of view).

Further, FIG. 4C depicts an example of a vehicle bounding box 452 and a vehicle characteristic bounding box 454 (around a license plate in this example), which may be generated by the camera or by other aspects of a vehicle recognition and charge management system, such as vehicle detection and identification element 120 described above with respect to FIGS. 2 and 3.

Example Vehicle Presence and Characteristic Detection Process Flows

FIG. 5 depicts an example process flow 500 for performing vehicle presence and characteristic detection, such as for a vehicle recognition and charge management system like system 200 described with respect to FIGS. 1-3. In one example, aspects of process flow 500 may be performed by vehicle detection and identification element 120, and in particular vehicle characteristic detection element 126 described above with respect to FIGS. 2 and 3.

Flow 500 beings at step 502 with receiving an image of a single charging location (e.g., a single parking stall as in the image of FIG. 4C). In some examples, the image data is (or is part of) camera data 110, as described above with respect to FIGS. 1 and 2.

Flow 500 then proceeds to step 504 with determining if a vehicle is detected. In one example, this determination may be made by a presence detection element, such as presence detection element 105 of camera 104 or presence detection element 122 of vehicle detection and identification element 120 in FIG. 2. If at step 504 a vehicle is not detected, the flow 500 returns to step 502. If at step 504 a vehicle is detected, then flow 500 proceeds to step 506.

At step 506, the image data may optionally be cropped to a vehicle bounding box, such as depicted in the example of FIG. 4C. Cropping to the vehicle bounding box may improve the performance of various predictive models, such as those described with respect to FIG. 3, by limiting the input data to relevant pixels associated with a subject vehicle, which in turn reduces "noise" in the input data to the various models.

Flow 500 then proceeds to step 508 where a vehicle characteristic is selected for prediction. The selected characteristic may be, for example, any one of the characteristics described with respect to FIG. 3. For example, a license plate may be selected as a characteristic to detect in the image data.

Flow 500 then proceeds to step 510 where the selected characteristic is either detected or not detected.

If the characteristic is not detected, flow 500 proceeds to step 516 where it is determined if another characteristic is available to be detected. For example, if a license plate is not detected (e.g., if it is a new vehicle without a license plate), then a vehicle make may be selected as a next characteristic to detect.

If the characteristic is detected, flow 500 proceeds to step 512 where another crop may optionally be performed to a bounding box around the detected characteristic, such as around the license plate (as shown at 454 in FIG. 4C). As above, the crop may improve the performance of the characteristic detection by omitting image data unrelated to the characteristic. For example, a bumper sticker adjacent to a license plate may cause false detection of license plate characters.

Flow 500 then proceeds to step 514 where the characteristic is predicted. Continuing with the license plate example, the characters on the license plate (and in some cases the plate state and/or style) are predicted, such as by license plate model 302 in FIG. 3. Further, as described with respect to FIG. 3, a confidence value may be determined for each characteristic prediction, such as for e.g., character predicted to be a part of the license plate in this example.

Flow 500 then proceeds to step 516 where it is determined if additional characteristics are available to be detected. In some cases, this may be determined by what models are available for characteristic production in a given system configuration. For example, for every model available (e.g., the models described with respect to FIG. 3), there may be one or more characteristics available for prediction.

If an additional characteristic is available, then flow 500 returns to step 508. If an additional characteristic is not available, then flow 500 proceeds to step 518.

At step 518, the predicted vehicle characteristic data is output (e.g., to charge management element 140 as described above with respect to FIG. 2). Then flow 500 may optionally return to step 502.

Note that flow 500 in just one example, and other flows having additional, fewer, alternative, or differently ordered steps may be implemented. For example, while characteristic detection in flow 500 is performed in serial fashion, in another implementation, the detection of various characteristics may be done in parallel. In some cases, a system may be set up to only detect a single characteristic, in which case various control loops in the example of FIG. 5 may be omitted.

FIG. 6 depicts another example process flow 600 for performing vehicle and characteristic detection, such as for a vehicle recognition and charge management system like system 200 described with respect to FIGS. 1-3. In one example, aspects of process flow 600 may be performed by vehicle detection and identification element 120, and in particular vehicle characteristic detection element 126 described above with respect to FIGS. 2 and 3.

Unlike in the flow 500 described with respect to FIG. 5, in this example flow 600 begins at step 602 with receiving image data with multiple charging locations (e.g., multiple parking stalls, such as depicted in the images of FIGS. 4A and 4B).

Flow 600 then proceeds to step 604 with generating bounding boxes for each charging location (e.g., each parking stall). In some cases, the bounding boxes may be predefined based on a fixed camera pose and known charging locations. In other cases, the bounding boxes may be generated dynamically using computer vision techniques, such as object detection, image segmentation, and the like.

Flow 600 then proceeds to step 606 with creating an image crop for each charging location.

Flow 600 then proceeds to step 608 with performing vehicle characteristic detection for each charging location. For example, flow 500 described with respect to FIG. 5 may be performed for each image crop created at step 606.

Flow 600 then proceeds to step 610 with outputting vehicle characteristic data for each detected vehicle (e.g., to charge management element 140 as described above with respect to FIG. 2).

Flow 600 may then optionally return to step 602.

Note that flow 600 in just one example, and other flows having additional, fewer, alternative, or differently ordered steps may be implemented.

Example Charge Management Process Flows

Figure 7:
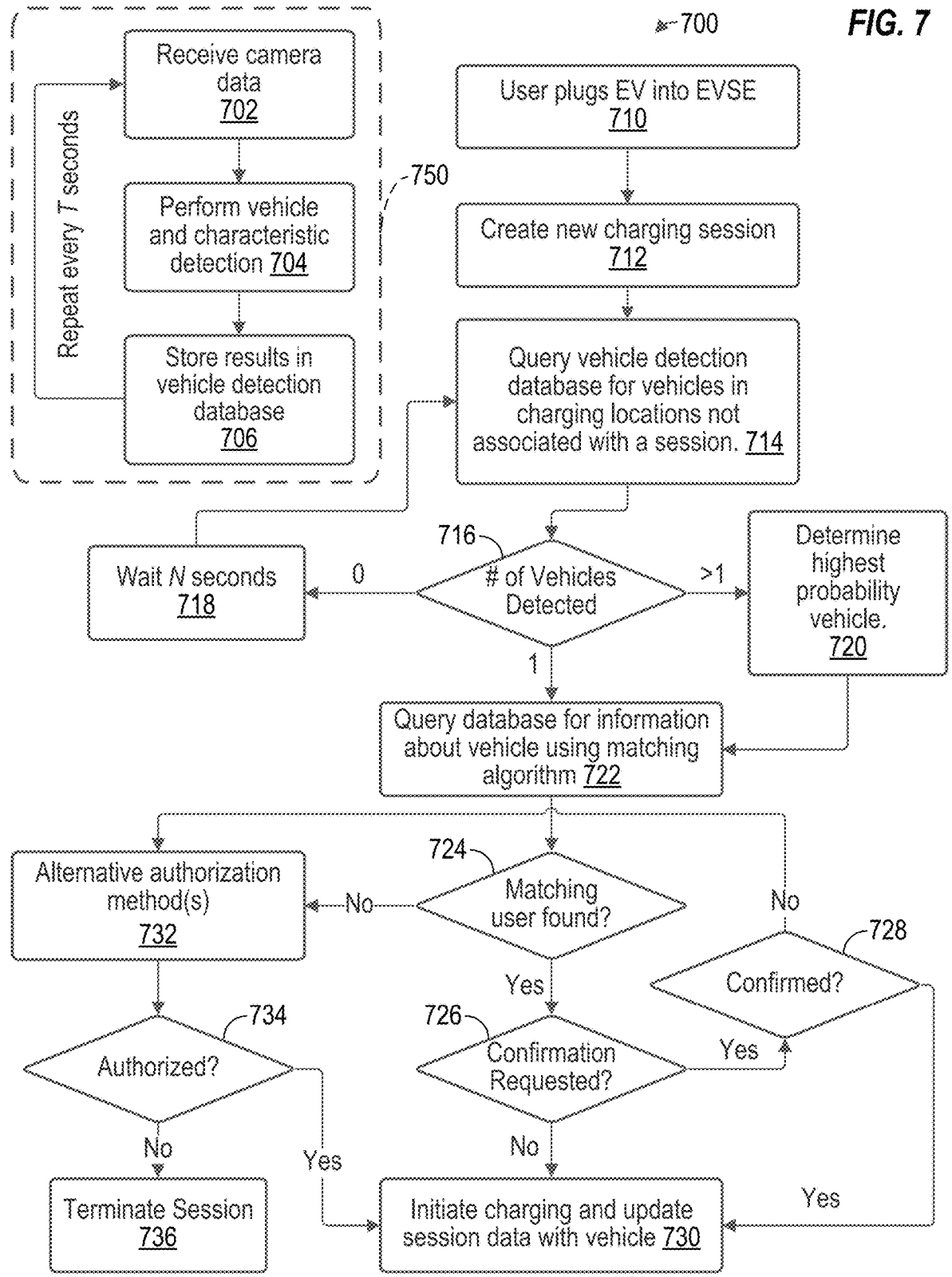
FIG. 7 depicts an example flow for charge management.

FIG. 7 depicts an example flow 700 for charge management. Flow 700 is an example of an asynchronous vehicle (and characteristic) detection and charging session management flow. Flows 700 and 750 may be implemented by a vehicle recognition and charge management system, such as the system 200 described with respect to FIG. 2.

Initially, flow 750 begins at step 702 with receiving camera data (e.g., 110 as described above with respect to FIGS. 1 and 2), for example, at a vehicle detection and identification process (e.g., such as 120 described above with respect to FIGS. 2 and 3). The camera data may be from one camera or from multiple cameras, and the camera data may cover single parking locations or multiple parking locations, as described above. In some cases, camera data received from a particular camera is associated with one or more EVSEs visible within the camera's field of view and/or with one or more charging locations within the camera's field of view. The association may be stored in a database, e.g., as an association between a unique identifier for a camera and one or more unique identifiers for charging locations and/or EVSEs.

After receiving camera data at step 702, flow 750 proceeds to step 704 with detecting vehicle presence and characteristic data based on the camera data. For example, flows 500 or 600 described with respect to FIGS. 5 and 6, respectively, may be performed at step 704 based on the type of camera data received.

Flow 750 then proceeds to step 706 in which the results of the detections at step 704 are stored in a data store, such as a database. In one example, the data store is a vehicle detection database maintained by charge management element 140 of FIG. 2 (e.g., by session management element 146). Flow 750 is then repeated at a determined time interval (e.g., T second in this example).

Notably, flow 750 runs at a set interval (T seconds in this example) whether or not a charging session has been initiated in flow 700, and thus is described as asynchronous with respect to flow 700.

Flow 700 begins at step 710 when a user plugs an EV into a charging station, e.g., an EVSE 106 in FIG. 1.

At step 712, a new charging session is created and stored, for example, in a database. In one example, the database may be an uncorrelated or unclaimed charging session database maintained by charge management element 140 of FIG. 2 (e.g., by session management element 146).

At step 714, the vehicle detection database is queried for vehicles in charging locations not yet associated with a charging station. In some cases, the charging locations may be limited to a set of locations associated with the EVSE with which the session was initiated in steps 710 and 712. For example, it may be known in advance that a particular EVSE can only reach with its charging cable four (or some other number) of different charging locations.

At step 716 a number of vehicles detected (e.g., in reply to the query at step 714) is determined.

If the number of vehicles detected at step 716 is zero, then flow 700 proceeds to step 718 where a time interval is observed (e.g., N seconds in this example) and then flow 700 proceeds back to step 714.

If the number of vehicles detected at step 716 is greater than one, then flow 700 proceeds to step 720 where a highest probability vehicle is determined. Generally, determining the highest probability vehicle may be based on various detected vehicle characteristics for the multiple vehicles detected.

For example, if multiple vehicles are detected, a highest probability vehicle may be detected based on arrival time and charging location to EVSE mapping probabilities. In one aspect, a distribution on a probability that a vehicle arrived at time $t_{arrive}$ and plugged in at time $t_{plug}$ may be denoted $P_{plug-time}(t_{plug}|t_{arrive})$ $P_{plug-time}$ time can follow a parameterized model or be learned from data. A further probability that vehicle in location L plugs into station S may be denoted as $P_{station}(S|L)$. Thus, the probability that a vehicle that arrived at time $t_{arrive}$ in location L is responsible for a charging session that began at time $t_{plug}$ on station S is $P(S, t_{plug}|L, t_{arrive})=P_{plug-time}(t_{plug}|t_{arrive})*P_{station}(S|L)$. The highest probability vehicle (e.g., the highest $P(S, t_{plug}|L, t_{arrive})$) may be determined to be associated with the newly created session at step 712. Then flow 700 proceeds to step 722.

If the number of vehicles detected at step 716 is one, then flow 700 proceeds to step 722.

At step 722, vehicle characteristic data is used to determine whether a matching vehicle associated with a user is found within the user database (e.g., user database 148 as described with respect to FIG. 2). For example, account matching element 142 may compare the vehicle characteristic data to known characteristics of vehicles associated with users in the user database.

In one example, fuzzy string matching is used to identify potential users associated with the vehicle in the user database. In one implementation, regular expressions may be used. Consider an example in which a user is matched to a detected vehicle based on a string of predicted license plate characters. The group of predicted license plate characters may include a group of all individual character predictions over a certain confidence threshold, and may additionally include commonly confused characters. For example, "1" is often confused with "I" by character recognition models. The user database may then be searched for license plates that match a regular expression based on the group of characters. Each license plate in the user database may be scored based on the product of confidence scores for each character and a match may be determined based on an overall confidence of the predicted license plate characters and the characters corresponding to license plates stored in the user database.

Note that this general matching procedure can be conducted for multiple vehicle characteristics (including all of those discussed with respect to FIG. 3). So, for example, if the license plate characters do not result in a sufficiently confident match, then the matching algorithm may move onto another vehicle characteristics, such as vehicle style, color, make, model, etc. In some cases, vehicle characteristics may be iteratively considered until a vehicle in the user database is matched with a confidence above a set confidence threshold, or until there are no further vehicles in the database to consider. Alternatively, a highest confidence vehicle may be selected from the database regardless of a confidence threshold.

At step 724, it is determined if a matching vehicle and associated user is found based on the aforementioned considerations (e.g., whether a vehicle in the database has sufficient confidence score, or taking the highest confidence vehicle).

If at step 724 no matching user is found, then flow 700 proceeds to step 732 where alternative authorization methods may be tried before terminating the session. For example, a mobile application (e.g., charge management application 162 in FIG. 2) may be used to manually authorize the session, an RFID card may be used at the EVSE to authorize the session (e.g., via charge authorization element 109 of EVSE 106 in FIG. 2), or other types of alternative authorization methods (which may include user authentication steps) may be tried.

Based on these alternative authorization methods, a determination is made at step 734 whether the session is authorized. If authorized, flow 700 proceeds to step 730 where the charging session is authorized and the user's account may be updated based on the charge details. For example, with respect to FIG. 2, the charge management element 140 may send charge management data 170 to EVSE 106 confirming the charge authorization, and thus EVSE 106 will either begin or continue the charging. If continuing the charging, the charging may be increased to a higher rate.

In some cases, the charge management data 170 may include parameters specific to the type of charging that is being performed by the EVSE, such as DC fast charging or Level 2 charging. For example, for Level 2 charging, the charge rate may be a parameter included in the charge management data 170 sent to the EVSE to control the charging.

If not authorized at step 734, then flow 700 proceeds to step 736 where the charging session is terminated. For example, with respect to FIG. 2, the charge management element 140 may send charge management data 170 to EVSE 106 denying the charge authorization, and thus EVSE 106 will either not begin or discontinue the charging. In some cases, EVSE 106 may begin charging prior to authorization, but may limit the charge current until fully authorized.

If at step 724 a matching user is found, then it is determined at step 726 whether the matched user has a confirmation requested configuration set. For example, the user's profile may be configured (e.g., through charge management application 162 in FIG. 2) so that no charging session can be initiated (and therefore no charges may be incurred) until the user proactively confirms the session.

If at step 726 the user has requested a session confirmation, then flow 700 proceeds to step 728 where the user is queried for a confirmation. For example, as described above, the user may be sent a push notification (e.g., to user device 160 in FIG. 2), a text message, an automated call, or the like. In some cases, the confirmation may request further information in regards to the charging session, such as the amount of requested charge (e.g., to a certain percentage of overall charge capacity, or a certain amount of energy (e.g., a number of kWh of charge), or a certain amount of cost, etc.). The confirmation may further request information, such as the amount of time the user expects to be parked. These are just some examples, and others are possible.

If the session is confirmed at step 728, or if no confirmation is needed at step 726, then a charging session is initiated at step 730. For example, with respect to FIG. 2, the charge management element 140 may send charge management data 170 to EVSE 106 authorizing the charging session, and thus EVSE 106 may begin or continue charging the EV connected to the EVSE at step 710. When the charging session is initiated, the user's account (e.g., as stored in user database 148 as described with respect to FIG. 2) may be updated accordingly.

Note that when a matching user is found at step 724 and no confirmation is needed per step 726, the charging is initiated at step 730 without user interaction, thus making the process efficient and easy for the user. The user can simply park, plug the vehicle into an EVSE, and walk away as the charging session authorization is automatically determined based on recognizing the vehicle through its various characteristics.

If the session is not confirmed at step 728, then flow 700 may proceed to step 732 to try alternative authorization methods. Alternatively, the session may be terminated at step 736.

Note that flows 700 and 750 are just one example, and other flows including additional, alternative, or fewer steps, or steps in a different order, are possible consistent with the various aspects described herein.

Figure 8:
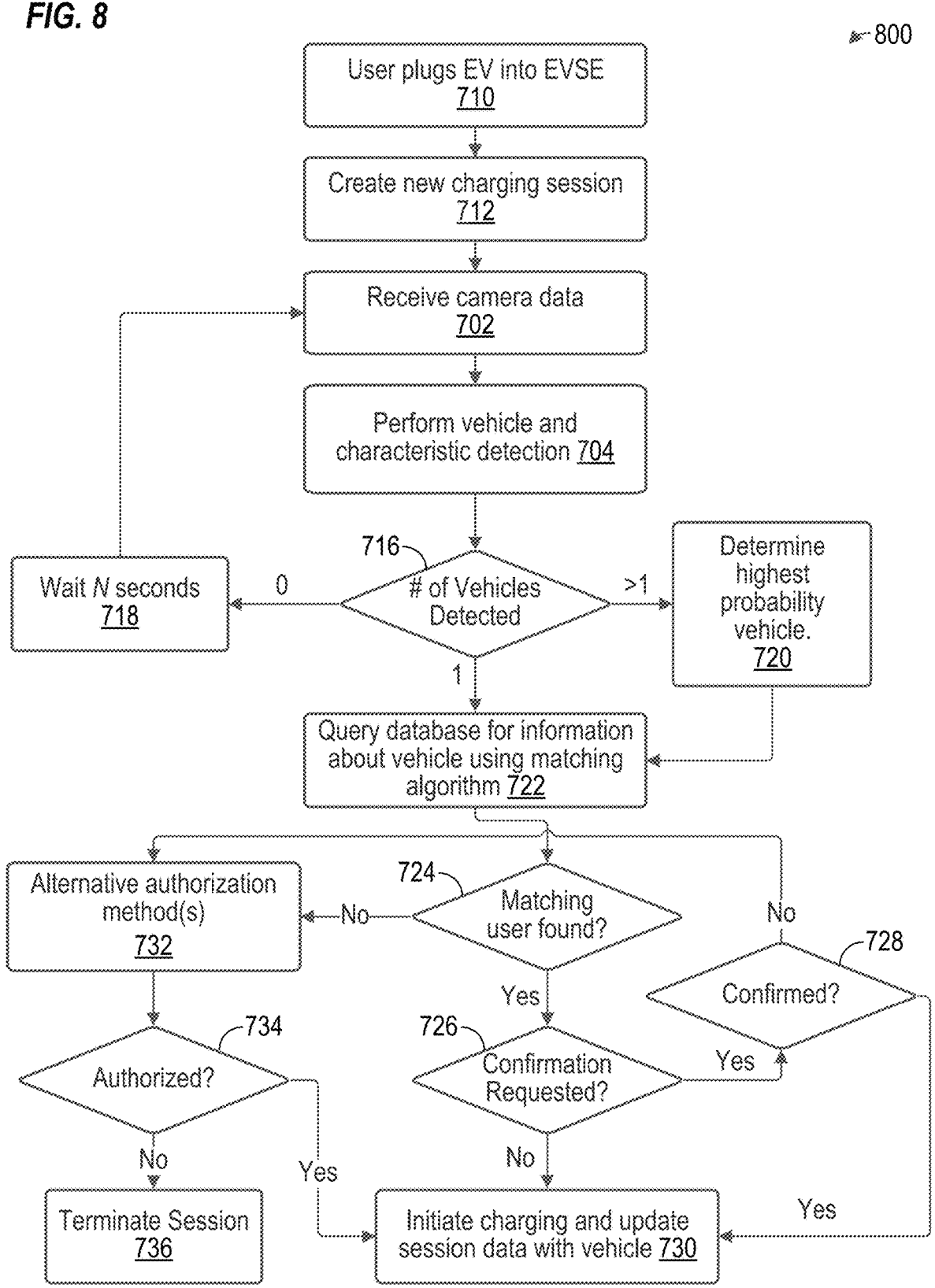
FIG. 8 depicts another example flow for charge management.

FIG. 8 depicts another example flow 800 for charge management. Flow 800 is an example of a synchronous vehicle (and characteristic) detection and charging session management flow. Flow 800 may be implemented by a vehicle recognition and charge management system, such as the system 200 described with respect to FIG. 2.

As compared to the flow of FIG. 7, in FIG. 8 the receiving of camera data at step 702 is done based on a new charge session being created at step 712 (e.g., synchronously). After receiving the camera data at step 702, vehicle and characteristic detection is performed at step 704. Thus, step 714 in flow 700 of FIG. 7 is replaced by in-line steps 702 and 704 in FIG. 8. Then the remainder of flow 800 proceeds from step 716 as described with respect to FIG. 7.

Note that flow 800 is one example, and other flows including additional, alternative, or fewer steps, or steps in a different order, are possible consistent with the various aspects described herein.

Example Charge Location Blocking Detection Process Flow

Figure 9:
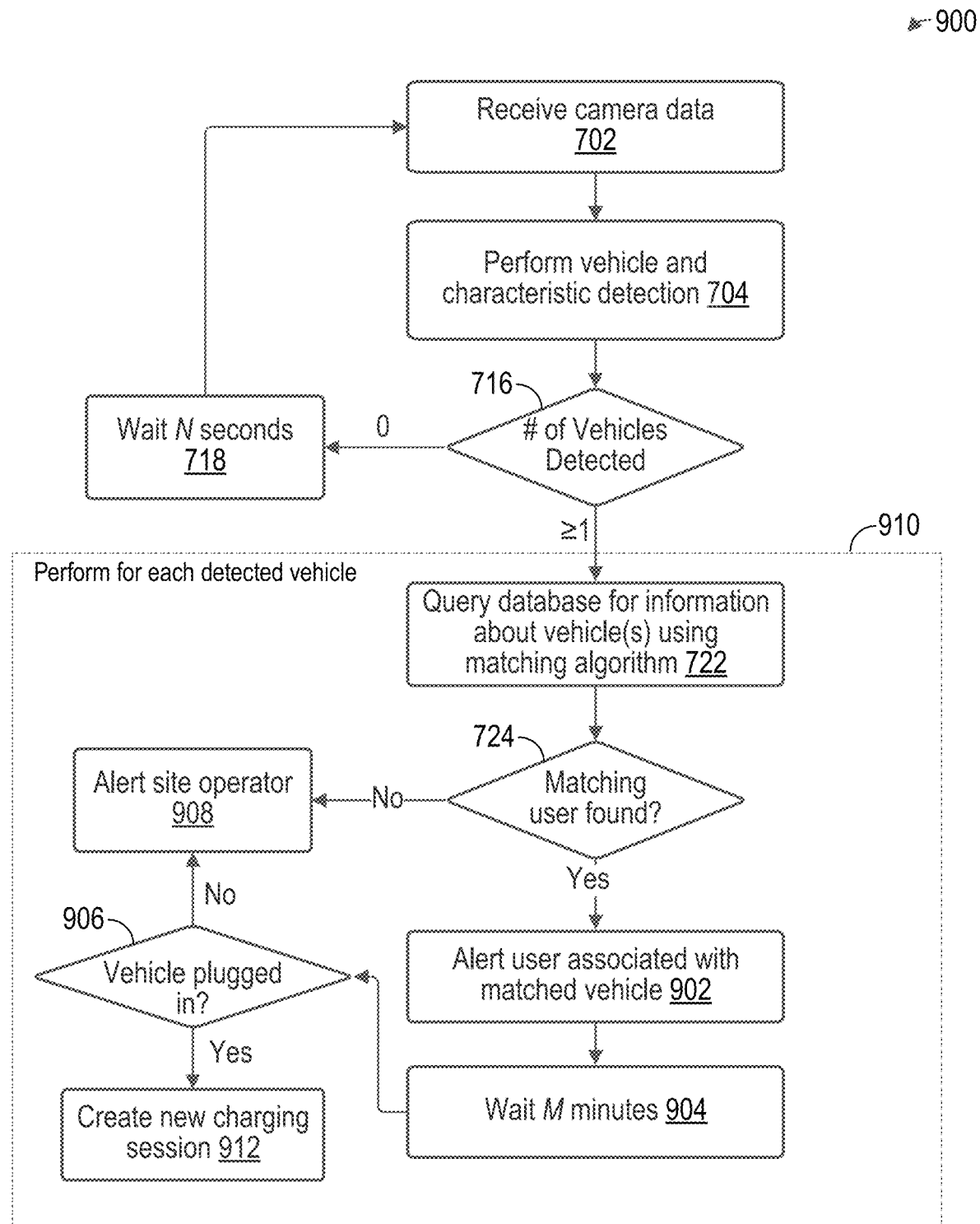
FIG. 9 depicts an example flow for detecting blocked charging locations.

FIG. 9 depicts an example flow 900 for detecting blocked charging locations. A blocked charging location is, for example, a parking stall in which a car is parked but not plugged in to an EVSE associated with the parking stall (and thus not charging), or plugged in but not charging.

Flow 900 begins at step 702 with receiving camera data, such as described above with respect to FIGS. 7 and 8.

Flow 900 then proceeds to step 704 with performing vehicle and characteristic detection, such as described above with respect to FIGS. 7 and 8.

Flow 900 then proceeds to step 716 with determining a number of vehicles detected in the camera data, such as described above with respect to FIGS. 7 and 8.

If at step 716 no vehicles are detected, then flow 900 proceeds to step 718 where an interval is observed (e.g., N seconds in this example) and then flow 900 proceeds back to step 702.

If at step 716 one or more vehicles are detected, then flow 900 proceeds to step 722 with querying a database (e.g., user database 148 of FIG. 2) for information about vehicles using a matching algorithm (e.g., a fuzzy matching algorithm), as described above with respect to FIGS. 7 and 8.

Flow 900 then proceeds to step 724 where it is determined if a matching user (associated with the vehicle) has been found, such as described above with respect to FIGS. 7 and 8.

If at step 724 no matching user has been found, then a site operator may be alerted to the blocked charging location at step 908. For example, a site operator may be notified by push notification, text message, email, automated call, or the like. Based on the information, the site operator may attempt to contact the vehicle owner, or may ticket or tow the vehicle.

If at step 724 a matching user is found, then the user is alerted to the blocked charging location at step 902. The user may be notified by push notification (e.g., to charge management application 162 in FIG. 2), text message, email, automated call, or the like.

Flow 900 then proceeds to step 904 where an interval is observed (M minutes in this example) in order to allow the notified user to respond to the alert. For example, the user may receive the alert and return to its vehicle to move or plug in the vehicle to begin a charging session.

Flow 900 then proceeds to step 906 where it is determined if the user's vehicle is now plugged in.

If at step 906 the user's vehicle is not plugged in, then flow 900 proceeds to step 908 where the site operator is alerted, as described above.

If at step 906 the user's vehicle is plugged in, then flow 900 proceeds to step 912 where a new charging session may be created. For example, step 912 may step into the process described with respect to step 712 of FIG. 7 or FIG. 8 and following flow 700 or 800 respectively.

The steps within sub-flow 910 (indicted by the dotted box) may generally be performed for each vehicle detected at step 704.

Though not depicted in FIG. 9, in another example, there may be an additional interval imposed (e.g., wait period) associated with each detected vehicle before taking action, such as alerting the user or site operator. This may allow for vehicles that are detected while driving by a charging location, or pulling into a charging location only temporarily, such as to turn around. Thus, false positive "blocking" conditions may be avoided.

In addition to helping site operators keep charging locations available for charging customers, flow 900 may be particularly helpful for fleet operators to ensure that fleet vehicles are properly plugged at the end of each work shift and thus charged and ready prior to the next work shift.

In an alternative embodiment (not depicted), if a matching user is not found at step 724, the flow 900 proceeds to step 906 to determine whether the vehicle is plugged into an EVSE. In such an embodiment, the site operator would only be alerted if the vehicle is not plugged in. This may be the case for sites that do not require authentication for charging (such as free charging at a workplace), but which like to know if spaces are being blocked by cars that are not charging.

Note that flow 900 is one example, and other flows including additional, alternative, or fewer steps, or steps in a different order, are possible consistent with the various aspects described herein.

Example Method for Electric Vehicle Charging Management

Figure 10:
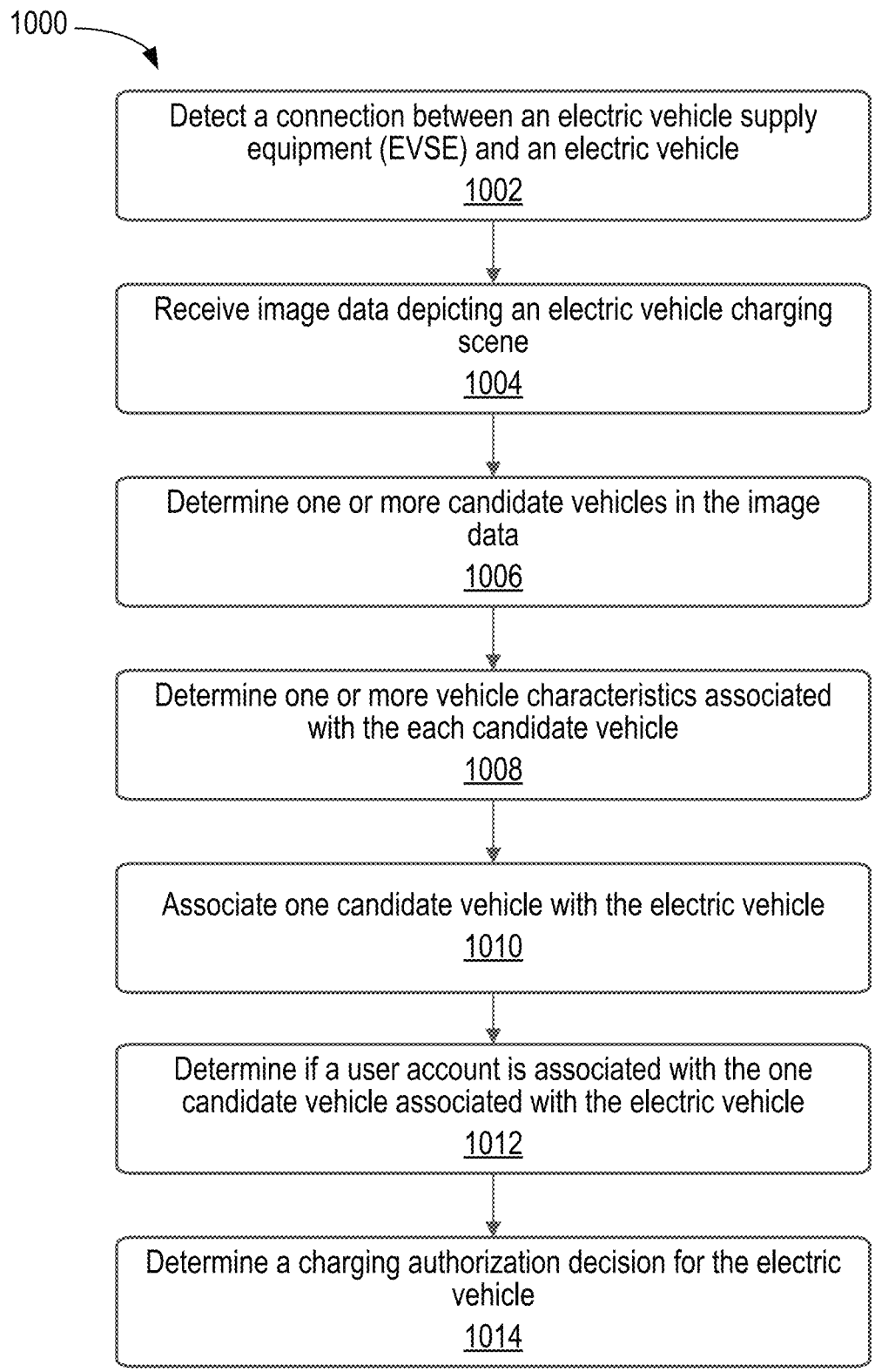
FIG. 10 depicts an example method for electric vehicle charging management.

FIG. 10 depicts an example method 1000 for electric vehicle charging management.

Method 1000 begins at step 1002 with detecting a connection between an electric vehicle supply equipment (EVSE) and an electric vehicle, such as a connection between EVSE 106 and a vehicle 102 as described above with respect to FIGS. 1 and 2.

Method 1000 then proceeds to step 1004 with receiving image data depicting an electric vehicle charging scene, such as the examples depicted in FIGS. 4A-4C.

In some aspects, the image data comprises a cropped image smaller than an original image captured by a camera, such as discussed above with respect to FIGS. 4A-4C. In some aspects, the image data is generated by a camera integral with the EVSE.

Method 1000 then proceeds to step 1006 with determining one or more candidate vehicles in the image data, such as described above with respect to FIGS. 7 and 8.

Method 1000 then proceeds to step 1008 with determining one or more vehicle characteristics associated with the respective candidate vehicle for each respective candidate vehicle of the one or more candidate vehicles in the image data. For example, the characteristics may include those described with respect to FIG. 3. In some aspects, the one or more vehicle characteristics may be determined by using characteristic-specific models, such as those described with respect to FIG. 3.

In some aspects, the one or more vehicle characteristics comprise one or more of: a license plate state; a license plate style; one or more license plate characters; a vehicle model; a vehicle make; a vehicle color; a vehicle style; a vehicle location; a vehicle arrival time; an identification graphic; and a plugged status. In some aspects, the vehicle characteristics comprise a QR code.

Method 1000 then proceeds to step 1010 with associating one candidate vehicle of the one or more candidate vehicles with the electric vehicle based on one or more vehicle characteristics associated with the one candidate vehicle.

For example, the vehicle may be determined as the highest probability vehicle, as discussed above with respect to step 720 of FIGS. 7 and 8.

In some aspects, associating the one candidate vehicle of the one or more candidate vehicles with the electric vehicle based on the one or more vehicle characteristics associated with the one candidate vehicle comprises: determining an EVSE location; determining an estimated location for each of the one or more candidate vehicles; and associating the one candidate vehicle that is closest to the EVSE location with the electric vehicle.

In some aspects, associating the one candidate vehicle of the one or more candidate vehicles with the electric vehicle based on the one or more vehicle characteristics associated with the one candidate vehicle comprises: determining an arrival time for the each of the one or more candidate vehicles; determining an estimated location for each of the one or more candidate vehicles; and determining a connection time for the EVSE.

Method 1000 then proceeds to step 1012 with determining if a user account is associated with the one candidate vehicle associated with the electric vehicle, such as described above with respect to step 722 of FIGS. 7 and 8.

In some aspects, determining if the user account is associated with the one candidate vehicle associated with the electric vehicle comprises providing the one or more vehicle characteristics associated with the one candidate vehicle to a matching algorithm to determine the user account. In some aspects, the matching algorithm is a fuzzy matching algorithm.

Method 1000 then proceeds to step 1014 with determining a charging authorization decision for the electric vehicle, such as described above with respect to FIGS. 7 and 8.

In some aspects, the charging authorization decision initiates charging of the electric vehicle. In some aspects, the charging authorization decision denies charging of the electric vehicle.

In some aspects, method 1000 further includes requesting the image data after detecting the connection between the EVSE and the electric vehicle.

In some aspects, method 1000 further includes transmitting a confirmation request to a user associated with the user account; receiving a confirmation from the user; determining the charge authorization decision based on the received confirmation; and initiating charging of the electric vehicle, such as described above with respect to FIGS. 7 and 8.

In some aspects, method 1000 further includes transmitting a confirmation request to a user associated with the user account; receiving no confirmation from the user; and denying charging of the electric vehicle.

In some aspects determining the one or more candidate vehicles in the image data is performed by a camera device. In some aspects, method 1000 is performed by a camera device.

Note that method 1000 is one example, and other methods including additional, alternative, or fewer steps, or steps in a different order, are possible consistent with the various aspects described herein.

Example Method for Electric Detecting a Blocked Charging Location

Figure 11:
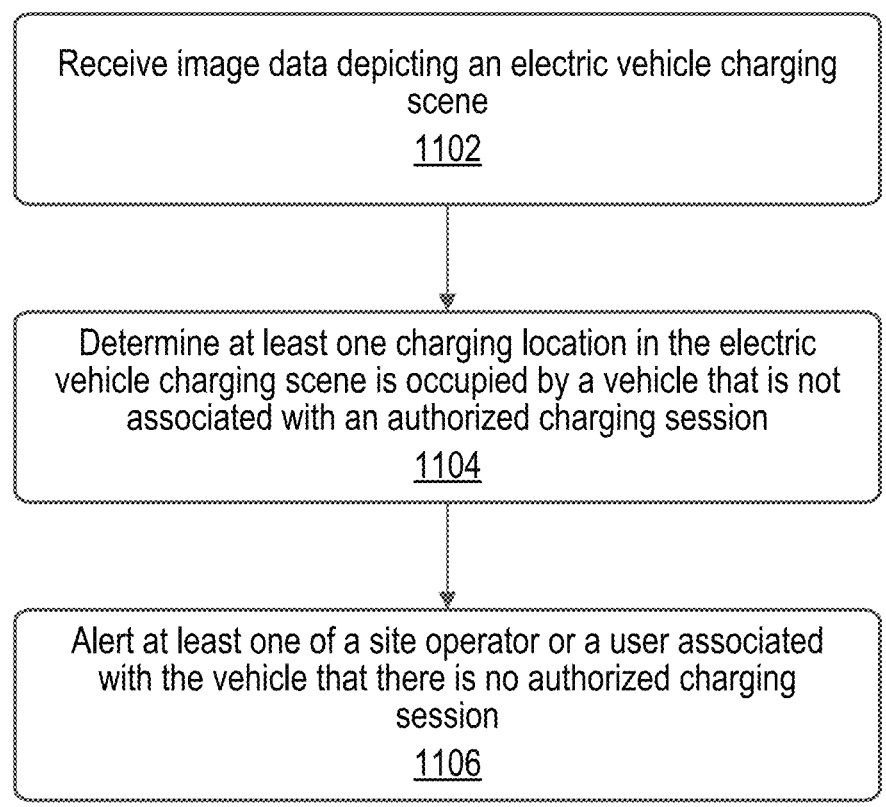
FIG. 11 depicts an example method for detecting a blocked charging location.

FIG. 11 depicts an example method 1100 for detecting a blocked charging location.

Method 1100 begins at step 1102 with receiving image data depicting an electric vehicle charging scene.

Method 1100 then proceeds to step 1104 with determining at least one charging location in the electric vehicle charging scene is occupied by a vehicle that is not associated with an authorized charging session, for example, as described above with respect to FIG. 9.

Method 1100 then proceeds to step 1106 with alerting at least one of a site operator or a user associated with the vehicle that there is no authorized charging session, for example, as described above with respect to FIG. 9.

In some aspects, method 1100 further includes determining a user associated with the vehicle, for example, as described above with respect to FIG. 9.

In some aspects, method 1100 further includes determining that vehicle has been plugged into an EVSE and creating a new charging session for the vehicle, for example, as described above with respect to FIG. 9.

Note that method 1100 is one example, and other methods including additional, alternative, or fewer steps, or steps in a different order, are possible consistent with the various aspects described herein.

Example Processing System

Figure 12:
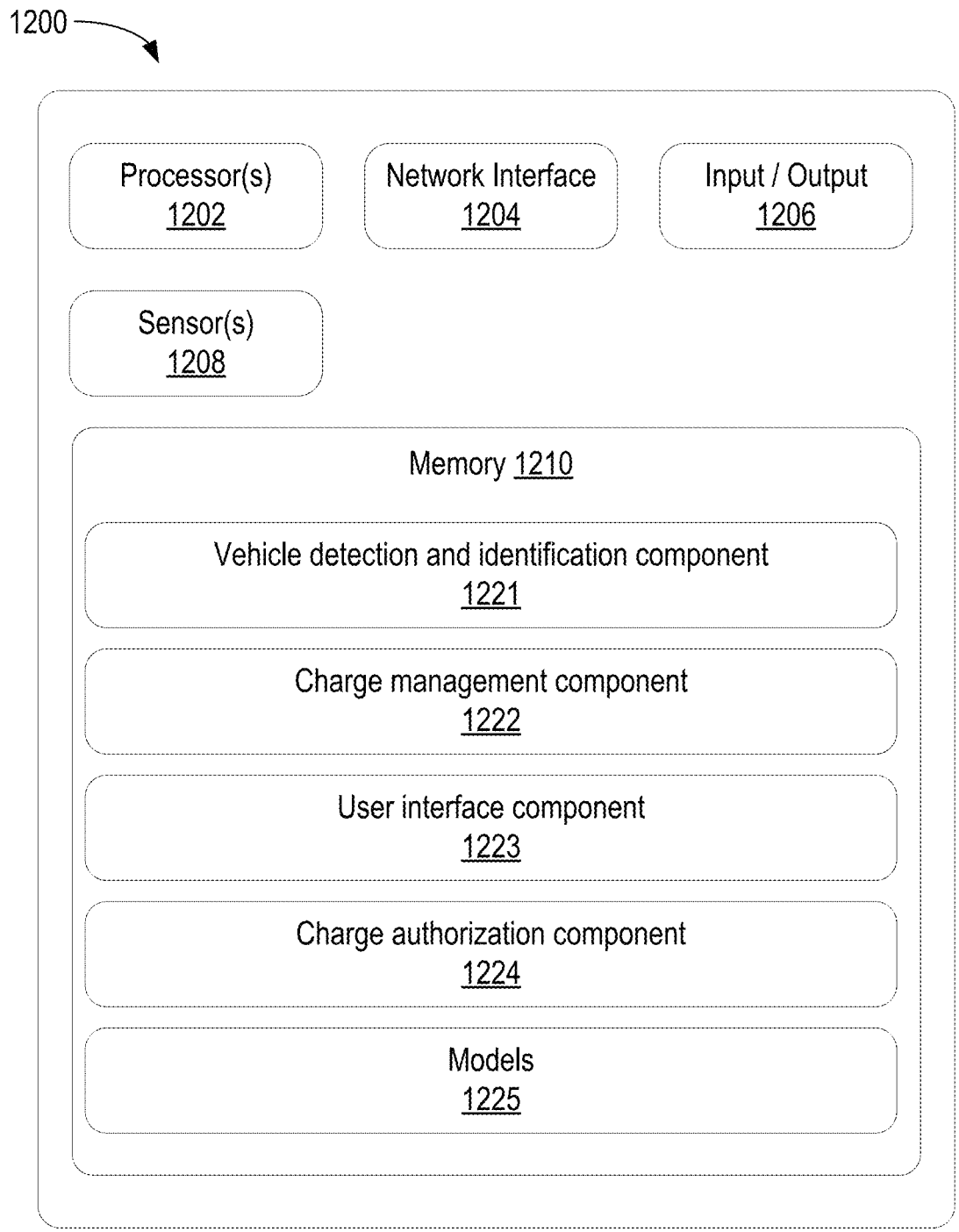
FIG. 12 depicts an example processing system configured to perform the methods described herein.

FIG. 12 depicts an example processing system 1200 configured to perform the methods described herein.

Processing system 1200 includes one or more processors 1202. Generally, a processor 1202 is configured to execute computer-executable instructions (e.g., software code) to perform various functions, as described herein.

Processing system 1200 further includes a network interface 1204, which generally provides data access to any sort of data network, including local area networks (LANs), wide area networks (WANs), the Internet, and the like.

Processing system 1200 further includes input(s) and output(s) 1206, which generally provide means for providing data to and from processing system 1200, such as via connection to computing device peripherals, including user interface peripherals.

Processing system 1200 further includes one or more sensors 1208. For example, sensors 1208 may include image sensors, proximity sensors, presence sensors, and other types of sensors as described herein.

Processing system 1200 further includes a memory 1210 comprising various components. In this example, memory 1210 includes a vehicle detection and identification component 1221 (such as component 120 of FIG. 2), a charge management component 1222 (such as component 140 of FIG. 2), a user interface component 1223, a charge authorization component 1224, and models 1225 (e.g., the models discussed with respect to FIG. 3).

Processing system 1200 may be implemented in various ways. For example, processing system may be implemented within an EVSE (e.g., EVSE 106 in FIGS. 1 and 2) or within a camera (e.g., camera 104 in FIGS. 1 and 2). However, in other implementations, aspects of processing system 1200 may be distributed, such as between a camera, an EVSE, and other processing equipment, including on-site, remote, or cloud-based processing equipment. Note that in various implementations, certain aspects may be omitted from processing system 1200.

Example Clauses

Implementation examples are described in the following numbered clauses:

Clause 1: A method for electric vehicle charging management, comprising: detecting a connection between an electric vehicle supply equipment (EVSE) and an electric vehicle; receiving image data depicting an electric vehicle charging scene; determining one or more candidate vehicles in the image data; for each respective candidate vehicle of the one or more candidate vehicles in the image data, determining one or more vehicle characteristics associated with the respective candidate vehicle; associating one candidate vehicle of the one or more candidate vehicles with the electric vehicle based on one or more vehicle characteristics associated with the one candidate vehicle; determining if a user account is associated with the one candidate vehicle associated with the electric vehicle; and determining a charging authorization decision for the electric vehicle.

Clause 2: The method of Clause 1, further comprising requesting the image data after detecting the connection between the EVSE and the electric vehicle.

Clause 3: The method of any one of Clauses 1-2, wherein associating the one candidate vehicle of the one or more candidate vehicles with the electric vehicle based on the one or more vehicle characteristics associated with the one candidate vehicle comprises: determining an EVSE location; determining an estimated location for each of the one or more candidate vehicles; and associating the one candidate vehicle that is closest to the EVSE location with the electric vehicle.

Clause 4: The method of any one of Clauses 1-2, wherein associating the one candidate vehicle of the one or more candidate vehicles with the electric vehicle based on the one or more vehicle characteristics associated with the one candidate vehicle comprises: determining an arrival time for the each of the one or more candidate vehicles; determining an estimated location for each of the one or more candidate vehicles; and determining a connection time for the EVSE.

Clause 5: The method of Clause 1, wherein determining if the user account is associated with the one candidate vehicle associated with the electric vehicle comprises providing the one or more vehicle characteristics associated with the one candidate vehicle to a matching algorithm to determine the user account.

Clause 6: The method of Clause 5, wherein the matching algorithm is a fuzzy matching algorithm or a probabilistic matching algorithm.

Clause 7: The method of any one of Clauses 1-6, further comprising: transmitting a confirmation request to a user associated with the user account; receiving a confirmation from the user; determining the charge authorization decision based on the received confirmation; and initiating charging of the electric vehicle.

Clause 8: The method of any one of Clauses 1-7, further comprising: transmitting a confirmation request to a user associated with the user account; receiving no confirmation from the user; and denying charging of the electric vehicle.

Clause 9: The method of any one of Clauses 1-8, wherein determining the one or more candidate vehicles in the image data is performed by a camera device.

Clause 10: The method of any one of Clauses 1-9, wherein the charging authorization decision initiates charging of the electric vehicle.

Clause 11: The method of any one of Clauses 1-9, wherein the charging authorization decision denies charging of the electric vehicle.

Clause 12: The method of any one of Clauses 1-11, wherein the image data comprises a cropped image smaller than an original image captured by a camera.

Clause 13: The method of any one of Clauses 1-12, wherein the image data is generated by a camera integral with the EVSE.

Clause 14: The method of Clause 1, wherein the one or more vehicle characteristics comprise one or more of: a license plate state; a license plate style; one or more license plate characters; a vehicle model; a vehicle make; a vehicle color; a vehicle style; a vehicle location; a vehicle arrival time; an identification graphic; and a plugged status.

Clause 15: The method of Clause 1, wherein the vehicle characteristics comprise a QR code.

Clause 16: A method of detecting a blocked charging location, comprising: receiving image data depicting an electric vehicle charging scene; determining at least one charging location in the electric vehicle charging scene is occupied by a vehicle that is not associated with an authorized charging session; alerting at least one of a site operator or a user associated with the vehicle that there is no authorized charging session.

Clause 17: The method of Clause 16, further comprising determining a user associated with the vehicle.

Clause 18: The method of any one of Clauses 17-18, further comprising determining that vehicle has been plugged into an EVSE; and creating a new charging session for the vehicle.

Clause 19: A processing system, comprising: a memory comprising computer-executable instructions; and one or more processors configured to execute the computer-executable instructions and cause the processing system to perform a method in accordance with any one of Clauses 1-18.

Clause 20: A processing system, comprising means for performing a method in accordance with any one of Clauses 1-18.

Clause 21: A non-transitory computer-readable medium comprising computer-executable instructions that, when executed by one or more processors of a processing system, cause the processing system to perform a method in accordance with any one of Clauses 1-18.

Clause 22: A computer program product embodied on a computer-readable storage medium comprising code for performing a method in accordance with any one of Clauses 1-18.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for electric vehicle charging management, comprising:
   detecting a connection between an electric vehicle supply equipment (EVSE) and an electric vehicle;
   receiving, after detecting the connection between the EVSE and the electric vehicle, image data depicting an electric vehicle charging scene including the electric vehicle connected to the EVSE;
   determining one or more candidate vehicles in the image data;

for each respective candidate vehicle of the one or more candidate vehicles in the image data, determining one or more vehicle characteristics associated with the respective candidate vehicle;

associating one candidate vehicle of the one or more candidate vehicles with the electric vehicle connected to the EVSE based on one or more vehicle characteristics associated with the one candidate vehicle;

determining if a user account is associated with the one candidate vehicle associated with the electric vehicle; and determining a charging authorization decision for the electric vehicle.

2. The method of claim 1, further comprising requesting the image data after detecting the connection between the EVSE and the electric vehicle.

3. The method of claim 1, wherein associating the one candidate vehicle of the one or more candidate vehicles with the electric vehicle based on the one or more vehicle characteristics associated with the one candidate vehicle comprises:

determining an EVSE location;
determining an estimated location for each of the one or more candidate vehicles; and
associating the one candidate vehicle that is closest to the EVSE location with the electric vehicle.

4. The method of claim 1, wherein associating the one candidate vehicle of the one or more candidate vehicles with the electric vehicle based on the one or more vehicle characteristics associated with the one candidate vehicle comprises:

determining an arrival time for the each of the one or more candidate vehicles;
determining an estimated location for each of the one or more candidate vehicles; and
determining a connection time for the EVSE.

5. The method of claim 1, wherein determining if the user account is associated with the one candidate vehicle associated with the electric vehicle comprises providing the one or more vehicle characteristics associated with the one candidate vehicle to a matching algorithm to determine the user account.

6. The method of claim 5, wherein the matching algorithm is a fuzzy matching algorithm or a probabilistic matching algorithm.

7. The method of claim 1, further comprising:
transmitting a confirmation request to a user associated with the user account;
receiving a confirmation from the user;
determining the charge authorization decision based on the received confirmation; and
initiating charging of the electric vehicle.

8. The method of claim 1, further comprising:
transmitting a confirmation request to a user associated with the user account;
receiving no confirmation from the user; and
denying charging of the electric vehicle.

9. The method of claim 1, wherein determining the one or more candidate vehicles in the image data is performed by a camera device.

10. The method of claim 1, wherein the charging authorization decision initiates charging of the electric vehicle.

11. The method of claim 1, wherein the charging authorization decision denies charging of the electric vehicle.

12. The method of claim 1, wherein the image data comprises a cropped image smaller than an original image captured by a camera.

13. The method of claim 1, wherein the image data is generated by a camera integral with the EVSE.

14. The method of claim 1, wherein the one or more vehicle characteristics comprise one or more of:
a license plate state;
a license plate style;
one or more license plate characters;
a vehicle model;
a vehicle make;
a vehicle color;
a vehicle style;
a vehicle location;
a vehicle arrival time;
an identification graphic; and
a plugged status.

15. The method of claim 1, wherein the vehicle characteristics comprise a QR code.

16. An apparatus configured for electric vehicle charging management, comprising:
a memory comprising computer-executable instructions;
a processor configured to execute the computer-executable instructions and cause the apparatus to:
detect a connection between an electric vehicle supply equipment (EVSE) and an electric vehicle;
receive, after the detection of the connection between the EVSE and the electric vehicle, image data depicting an electric vehicle charging scene including the electric vehicle connected to the EVSE;
determine one or more candidate vehicles in the image data;
for each respective candidate vehicle of the one or more candidate vehicles in the image data, determine one or more vehicle characteristics associated with the respective candidate vehicle;
associate one candidate vehicle of the one or more candidate vehicles with the electric vehicle connected to the EVSE based on one or more vehicle characteristics associated with the one candidate vehicle;
determine if a user account is associated with the one candidate vehicle associated with the electric vehicle; and
determine a charging authorization decision for the electric vehicle.

17. The apparatus of claim 16, wherein the processor is further configured to cause the apparatus to request the image data after detecting the connection between the EVSE and the electric vehicle.

18. The apparatus of claim 16, wherein in order to associate the one candidate vehicle of the one or more candidate vehicles with the electric vehicle based on the one or more vehicle characteristics associated with the one candidate vehicle, the processor is further configured to cause the apparatus to:
determine an EVSE location;
determine an estimated location for each of the one or more candidate vehicles; and
associate the one candidate vehicle that is closest to the EVSE location with the electric vehicle.

19. The apparatus of claim 16, wherein in order to associate the one candidate vehicle of the one or more candidate vehicles with the electric vehicle based on the one or more vehicle characteristics associated with the one candidate vehicle, the processor is further configured to cause the apparatus to:
determine an arrival time for the each of the one or more candidate vehicles;

determine an estimated location for each of the one or more candidate vehicles; and determine a connection time for the EVSE.

20. The apparatus of claim 16, wherein in order to determine if the user account is associated with the one candidate vehicle associated with the electric vehicle, the processor is further configured to cause the apparatus to provide the one or more vehicle characteristics associated with the one candidate vehicle to a matching algorithm to determine the user account.

\* \* \* \* \*